United States Patent
Zhou et al.

(10) Patent No.: US 10,681,715 B2
(45) Date of Patent: Jun. 9, 2020

(54) CONTROL INFORMATION COMBINING TECHNIQUES IN WIRELESS COMMUNICATIONS

(71) Applicant: QUALCOMM Incorporated, San Diego, CA (US)

(72) Inventors: Yan Zhou, San Diego, CA (US); Tao Luo, San Diego, CA (US); Juan Montojo, San Diego, CA (US); Makesh Pravin John Wilson, San Diego, CA (US); Xiao Feng Wang, San Diego, CA (US); Xiaoxia Zhang, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/256,665

(22) Filed: Jan. 24, 2019

(65) Prior Publication Data
US 2019/0313428 A1 Oct. 10, 2019

Related U.S. Application Data

(60) Provisional application No. 62/652,793, filed on Apr. 4, 2018.

(51) Int. Cl.
 *H04W 72/12* (2009.01)
 *H04J 11/00* (2006.01)
 (Continued)

(52) U.S. Cl.
 CPC ..... *H04W 72/1252* (2013.01); *H04J 11/0069* (2013.01); *H04L 5/0053* (2013.01); *H04L 27/2657* (2013.01)

(58) Field of Classification Search
None
See application file for complete search history.

(56) References Cited

U.S. PATENT DOCUMENTS 10,517,093 B2 * 12/2019 Abdoli ............. H04W 72/0453
2010/0182903 A1 7/2010 Palanki et al.
(Continued)

OTHER PUBLICATIONS

International Search Report and Written Opinion—PCT/US2019/020960—ISA/EPO—dated Jul. 10, 2019.
(Continued)

*Primary Examiner* — Anh Ngoc M Nguyen
(74) *Attorney, Agent, or Firm* — Linda G. Gunderson; Holland & Hart LLP

(57) ABSTRACT

Methods, systems, and devices for wireless communications are described that provide for transmissions of multiple instances of control information, such as remaining minimum system information (RMSI), that may be used for system access by a user equipment (UE). The multiple instances of the control information may be combined at the UE to enhance the likelihood of successful decoding of the control information. A base station may transmit an indication that combining of multiple instances of control information is supported by the base station, and may transmit the multiple instances of control information via configured downlink transmission resources. A UE may receive the indication that combining of multiple control information instances is supported, may identify two or more instances within downlink transmission resources configured for control information transmissions, and may combine signals received in each of the two or more instances to generate a combined control information signal.

30 Claims, 30 Drawing Sheets

(51) Int. Cl.
   *H04L 5/00* (2006.01)
   *H04L 27/26* (2006.01)

(56) References Cited

U.S. PATENT DOCUMENTS

2018/0323922 A1* 11/2018 Lindoff ............. H04W 36/0066
2019/0364603 A1* 11/2019 Qian .................. H04W 56/001

OTHER PUBLICATIONS

Partial International Search Report—PCT/US2019/020960—ISA/EPO—dated May 15, 2019.
Qualcomm Incorporated: "Remaining System Information Delivery Consideration," 3GPP Draft; R1-1713376 Remaining System Information Delievery Consideration, 3rd Generation Partnership Project (3GPP), Mobile Competence Centre; 650, Route Des Lucioles; F-06921 Sophia-Antipolis Cedex, vol. RAN WG1, No. Prague, Czech Republic; Aug. 21, 2017-Aug. 25, 2017, Aug. 20, 2017, XP051316181, 8 pages, Retrieved from the Internet: URL: http://www.3gpp.org/ftp/Meetings_3GPP_SYNC/RAN1/Docs/ [retrieved on Aug. 20, 2017] sections 4, 4.1,section 3.2.
Xinwei: "Discussion on timing indication based on SS block", 3GPP Draft; R1-1710223 Discussion on Timing Indication Based on SS Block, 3rd Generation Partnership Project (3GPP), Mobile Competence Centre ; 650, Route Des Lucioles ; F-06921 Sophia-Antipolis Cedex, vol. RAN WG1, No. Qingdao; Jun. 27, 2017-Jun. 30, 2017, Jun. 26, 2017 (Jun. 26, 2017), XP051299444, 6 pages, Retrieved from the Internet: URL:http://www.3gpp.org/ftp/Meetings_3GPP_SYNC/RAN1/Docs/ [retrieved on Jun. 26, 2017],section 2.

* cited by examiner

CONTROL INFORMATION COMBINING TECHNIQUES IN WIRELESS COMMUNICATIONS

CROSS REFERENCE

The present Application for Patent claims the benefit of U.S. Provisional Patent Application No. 62/652,793 by ZHOU, et al., entitled "CONTROL INFORMATION COMBINING TECHNIQUES IN WIRELESS COMMUNICATIONS," filed Apr. 4, 2018, assigned to the assignee hereof, and expressly incorporated by reference herein in its entirety.

BACKGROUND

The following relates generally to wireless communications, and more specifically to control information combining techniques in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

A base station may send control transmissions that may allow one or more UEs to identify various pieces of system information that may be used for system access. In some systems, a base station may transmit one or more synchronization signal blocks (SSBs) to one or more UEs, which may include system information. The UEs may be configured to monitor for system information within a search space, which may include multiple search candidates. For instance, each search space may include multiple control resource sets (CORESETs) containing multiple control channel elements (CCEs). The UE may be configured to monitor one or more search candidates in the search space, and may blindly decode the one or more CCEs of the search candidate to receive the control information. In some cases, one or more UEs may have channel conditions that may lead to lower reliability in receiving and decoding such control transmissions. Techniques for enhancing the likelihood of receiving control transmissions thus may be desirable and may enhance system efficiency and reliability.

SUMMARY

The described techniques relate to improved methods, systems, devices, and apparatuses that support control information combining techniques in wireless communications. Generally, the described techniques provide for transmissions of multiple instances of control information (e.g., remaining system control information (RMSI)) that may be used for system access by a user equipment (UE). The multiple instances of the control information may be combined at the UE to enhance the likelihood of successful decoding of the control information.

In some cases, a base station may transmit an indication that combining of multiple instances of control information is supported by the base station, and may transmit the multiple instances of control information via configured downlink transmission resources. A UE may receive the indication that combining of multiple control information instances is supported, may identify two or more instances within downlink transmission resources configured for control information transmissions, and may combine signals received in each of the two or more instances to generate a combined control information signal. The indication that combining of control information transmissions is supported may be provided, for example, via an indicator for enabled combining provided in a synchronization signal block (SSB), a phase difference between different reference signal transmissions, scrambling sequences used for different reference signals, a configuration table, or combinations thereof.

A method of wireless communication is described. The method may include receiving, from a base station, an indication that combining of multiple instances of RMSI related information is supported, identifying, based on the indication, two or more instances within downlink transmission resources configured for RMSI related information transmissions, combining signals received in each of the two or more instances to generate a combined RMSI related information signal, and decoding the combined RMSI related information signal to obtain the RMSI related information.

An apparatus for wireless communication is described. The apparatus may include a processor, memory in electronic communication with the processor, and instructions stored in the memory. The instructions may be executable by the processor to cause the apparatus to receiving, from a base station, an indication that combining of multiple instances of RMSI related information is supported, identifying, based on the indication, two or more instances within downlink transmission resources configured for RMSI related information transmissions, combining signals received in each of the two or more instances to generate a combined RMSI related information signal, and decoding the combined RMSI related information signal to obtain the RMSI related information.

Another apparatus for wireless communication is described. The apparatus may include receiving, from a base station, an indication that combining of multiple instances of RMSI related information is supported, identifying, based on the indication, two or more instances within downlink transmission resources configured for RMSI related information transmissions, combining signals received in each of the two or more instances to generate a combined RMSI related information signal, and decoding the combined RMSI related information signal to obtain the RMSI related information.

A non-transitory computer-readable medium storing code for wireless communication is described. The code may include instructions executable by a processor to receiving, from a base station, an indication that combining of multiple instances of RMSI related information is supported, identifying, based on the indication, two or more instances within downlink transmission resources configured for RMSI related information transmissions, combining signals received in each of the two or more instances to generate a combined RMSI related information signal, and decoding the combined RMSI related information signal to obtain the RMSI related information.

In some examples of the method, apparatuses, and non-transitory computer-readable medium described herein, the RMSI related information includes scheduling information for an RMSI transmission. In some examples of the method, apparatuses, and non-transitory computer-readable medium described herein, the RMSI related information includes a payload of an RMSI transmission. In some examples of the method, apparatuses, and non-transitory computer-readable medium described herein, the two or more instances within downlink transmission resources configured for RMSI related information transmissions include two or more resources scheduled by a physical broadcast channel (PBCH) or a PDCCH associated with a given SSB ID, two or more resources scheduled by PBCH or PDCCH associated with different SSB IDs, or any combination thereof.

In some examples of the method, apparatuses, and non-transitory computer-readable medium described herein, the receiving the indication may include operations, features, means, or instructions for receiving the indication via at least one tone of one or more resource blocks (RBs) that may be partially occupied by a synchronization signal. In some examples of the method, apparatuses, and non-transitory computer-readable medium described herein, the at least one tone provides at least a one bit indicator via one or more RBs that may be partially occupied by a PSS, a SSS, or combinations thereof.

In some examples of the method, apparatuses, and non-transitory computer-readable medium described herein, the receiving the indication may include operations, features, means, or instructions for determining a phase difference between a first reference signal and a second reference signal transmitted within a SSB, where a value of the indication from the base station may be identified based on the phase difference. In some examples of the method, apparatuses, and non-transitory computer-readable medium described herein, the first reference signal may be a primary synchronization signal (PSS) transmitted within the SSB, and the second reference signal may be a secondary synchronization signal (SSS) transmitted within the SSB.

In some examples of the method, apparatuses, and non-transitory computer-readable medium described herein, the receiving the indication may include operations, features, means, or instructions for receiving the indication via an information field in a PBCH transmission within a SSB. In some examples of the method, apparatuses, and non-transitory computer-readable medium described herein, the receiving the indication may include operations, features, means, or instructions for determining a scrambling sequence of a reference signal associated with a PBCH transmission within a SSB, where a value of the indication from the base station may be identified based on which of a set of available scrambling sequences may be used to scramble the reference signal.

In some examples of the method, apparatuses, and non-transitory computer-readable medium described herein, the receiving the indication may include operations, features, means, or instructions for determining that a flag in a PBCH transmission may be set to signal a presence of the indication in a separate extended PBCH transmission and monitoring for the indication in the separate extended PBCH transmission. In some examples of the method, apparatuses, and non-transitory computer-readable medium described herein, the separate extended PBCH transmission may be transmitted by the base station via predefined wireless resources associated with a SSB.

In some examples of the method, apparatuses, and non-transitory computer-readable medium described herein, the receiving the indication may include operations, features, means, or instructions for receiving a first SSB that does not include RMSI transmissions and decoding, from the first SSB, the indication and an identification of at least a second SSB that includes at least on instance of the RMSI related information. In some examples of the method, apparatuses, and non-transitory computer-readable medium described herein, the receiving the identification of at least the second SSB includes a frequency offset of the second SSB relative to the first SSB.

In some examples of the method, apparatuses, and non-transitory computer-readable medium described herein, the receiving the indication may include operations, features, means, or instructions for receiving configuration information including an index value for a configuration table and determining, based on configuration table entries associated with the index value, that combining of multiple instances of the RMSI related information may be supported in transmissions from the base station. In some examples of the method, apparatuses, and non-transitory computer-readable medium described herein, the configuration table further indicates downlink transmission resources associated with the two or more instances of the RMSI related information.

A method of wireless communication is described. The method may include allocating two or more sets of downlink transmission resources for transmission of two or more instances of RMSI related information, transmitting an indication to a UE that combining of multiple instances of RMSI related information is supported, and transmitting the two or more instances of the RMSI related information via the two or more sets of downlink transmission resources.

An apparatus for wireless communication is described. The apparatus may include a processor, memory in electronic communication with the processor, and instructions stored in the memory. The instructions may be executable by the processor to cause the apparatus to allocating two or more sets of downlink transmission resources for transmission of two or more instances of RMSI related information, transmitting an indication to a UE that combining of multiple instances of RMSI related information is supported, and transmitting the two or more instances of the RMSI related information via the two or more sets of downlink transmission resources.

Another apparatus for wireless communication is described. The apparatus may include allocating two or more sets of downlink transmission resources for transmission of two or more instances of RMSI related information, transmitting an indication to a UE that combining of multiple instances of RMSI related information is supported, and transmitting the two or more instances of the RMSI related information via the two or more sets of downlink transmission resources.

A non-transitory computer-readable medium storing code for wireless communication is described. The code may include instructions executable by a processor to allocating two or more sets of downlink transmission resources for transmission of two or more instances of RMSI related information, transmitting an indication to a UE that combining of multiple instances of RMSI related information is supported, and transmitting the two or more instances of the RMSI related information via the two or more sets of downlink transmission resources.

In some examples of the method, apparatuses, and non-transitory computer-readable medium described herein, the two or more sets of downlink transmission resources for transmission of the two or more instances of RMSI related information include two or more resources scheduled by a PBCH or a PDCCH associated with a given SSB ID, two or more resources scheduled by the PBCH or the PDCCH associated with different SSB IDs, or any combination thereof.

In some examples of the method, apparatuses, and non-transitory computer-readable medium described herein, the transmitting the indication may include operations, features, means, or instructions for transmitting the indication via at least one tone of one or more RBs that may be partially occupied by a synchronization signal. In some examples of the method, apparatuses, and non-transitory computer-readable medium described herein, the at least one tone provides at least a one bit indicator via one or more RBs that may be partially occupied by a PSS, a SSS, or combinations thereof.

In some examples of the method, apparatuses, and non-transitory computer-readable medium described herein, the transmitting the indication may include operations, features, means, or instructions for selecting a phase difference between a first reference signal and a second reference signal transmitted within a SSB, where a value of the phase difference provides the indication and transmitting the first reference signal and the second reference signal based at least on the phase difference. In some examples of the method, apparatuses, and non-transitory computer-readable medium described herein, the first reference signal may be a PSS transmitted within the SSB, and the second reference signal may be a SSS transmitted within the SSB.

In some examples of the method, apparatuses, and non-transitory computer-readable medium described herein, the transmitting the indication may include operations, features, means, or instructions for transmitting the indication via an information field in a PBCH transmission within a SSB. In some examples of the method, apparatuses, and non-transitory computer-readable medium described herein, the transmitting the indication may include operations, features, means, or instructions for determining a scrambling sequence of a reference signal associated with a PBCH transmission within a SSB, where a value of the indication may be identified based on which of a set of available scrambling sequences may be used to scramble the reference signal.

In some examples of the method, apparatuses, and non-transitory computer-readable medium described herein, the transmitting the indication may include operations, features, means, or instructions for setting a flag in a PBCH transmission to signal a presence of the indication in a separate extended PBCH transmission and transmitting the indication in the separate extended PBCH transmission. In some examples of the method, apparatuses, and non-transitory computer-readable medium described herein, the separate extended PBCH transmission may be transmitted via predefined wireless resources associated with a SSB.

In some examples of the method, apparatuses, and non-transitory computer-readable medium described herein, the transmitting the indication may include operations, features, means, or instructions for transmitting a first SSB that includes the indication and an identification at least a second SSB that includes at least on instance of the RMSI related information. In some examples of the method, apparatuses, and non-transitory computer-readable medium described herein, the identification of at least the second SSB includes a frequency offset of the second SSB relative to the first SSB. In some examples of the method, apparatuses, and non-transitory computer-readable medium described herein, the transmitting the indication may include operations, features, means, or instructions for transmitting a first SSB that includes the indication and an identification at least a second SSB that includes at least on instance of the RMSI related information, where the identification of at least the second SSB includes a frequency offset of the second SSB relative to the first SSB.

In some examples of the method, apparatuses, and non-transitory computer-readable medium described herein, the transmitting the indication may include operations, features, means, or instructions for identifying an index value of a configuration table having one or more entries that include the indication and transmitting the index value. In some examples of the method, apparatuses, and non-transitory computer-readable medium described herein, the configuration table further indicates downlink transmission resources associated with the two or more instances of the RMSI related information. In some examples of the method, apparatuses, and non-transitory computer-readable medium described herein, the transmitting the indication may include operations, features, means, or instructions for identifying an index value of a configuration table having one or more entries that include the indication and transmitting the index value, where the configuration table further indicates downlink transmission resources associated with the two or more instances of the RMSI related information.

DETAILED DESCRIPTION

Various techniques provided herein provide for signaling of base station support for control information combining. A user equipment (UE) may, based on an indication of control information combining support, combine multiple instances of a control information signal and attempt to decode the control information from the combined signals. Such combining may enhance the likelihood of successful decoding of the control information at the UE, and enhance overall system efficiency and reliability. In some cases, a base station may transmit synchronization signal block (SSB) transmission that may include one or more reference signals and control information, such as remaining minimum system information (RMSI) that may be used by a UE (e.g., in conjunction with system information provided in a master information block (MIB)) for initial system access. In some cases, the indication that combining of multiple instances of control information is supported by the base station may be provided via an indicator for enabled combining provided in a SSB, a phase difference between different reference signal transmissions, scrambling sequences used for different reference signals, a configuration table, or combinations thereof.

A UE may receive the indication that combining of multiple control information instances is supported, may identify two or more instances within downlink transmission resources configured for control information transmissions, and may combine signals received in each of the two or more instances to generate a combined control information signal. In some cases, a UE may identify downlink resources that contain multiple instances of control information. The downlink resources may be within a SSB transmitted by the base station, may be across SSBs transmitted by the base station, or combinations thereof. The UE may monitor the identified downlink resources and buffer multiple instances of received control information signals in a soft combining buffer, and attempt to decode the control information using the combined instances of the transmitted control information. Such techniques may enhance the likelihood that the UE will successfully decode the control information and may access, or continue to access, a base station for wireless communications.

Aspects of the disclosure are initially described in the context of a wireless communications system. Various combining indications and combining techniques are then described in accordance with various teachings provided herein. Aspects of the disclosure are further illustrated by and described with reference to apparatus diagrams, system diagrams, and flowcharts that relate to control information combining techniques in wireless communications.

Figure 1:
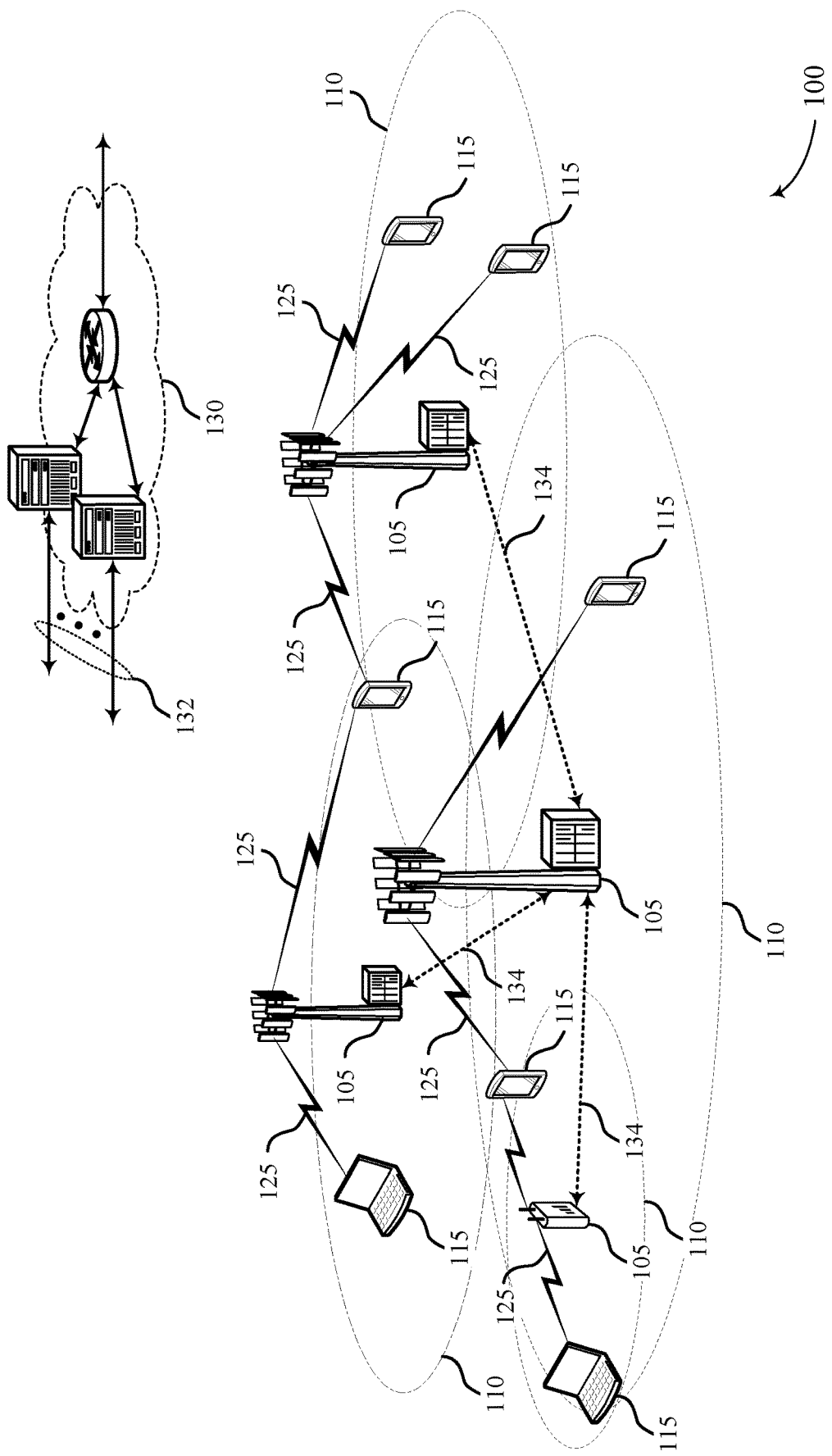
FIG. 1 illustrates an example of a wireless communications system that supports control information combining techniques in wireless communications in accordance with aspects of the present disclosure.

FIG. 1 illustrates an example of a wireless communications system 100 that supports control information combining techniques in wireless communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. Base stations 105 may, in some cases, transmit multiple instances of control information that may be combined at one or more UEs 115 to enhance the likelihood of successful reception at the UEs 115.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing multicarrier modulation (MCM) techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, as indicated above, UEs 115 may receive and decode control information provided by base stations 105 for initial system access, or for continuing system access. For example, a base station 105 may transmit RMSI related information (e.g., via RMSI PDCCH, RMSI PDSCH, or combinations thereof) that may be used by a UE 115 for initial system access. In cases where a UE 115 is at or near a cell edge or otherwise in a location where channel quality may be relatively poor, the UE 115 may be less likely to successfully receive and decode RMSI related information, and system access may be delayed until such control information is successfully decoded. In order to enhance the likelihood of successful reception and decoding of such control information, some base stations 105 may transmit multiple instances of the control information that may be combined at such UEs 115, with the combined signal used for decoding of the control information. Various techniques provided herein provide for signaling of base station 105 support for control information combining. In some cases, a base station 105 may transmit SSB transmission that may provide such an indication via, for example, a one or two bit indicator for enabled combining provided in a SSB, a phase difference between different reference signal transmissions, scrambling sequences used for different reference signals, a configuration table, or combinations thereof.

A UE 115 may receive the indication that combining of multiple control information instances is supported, may identify two or more instances within downlink transmission resources configured for control information transmissions, and may combine signals received in each of the two or more instances to generate a combined control information signal. In some cases, a UE 115 may identify downlink resources that contain multiple instances of control information. The downlink resources may be within a SSB transmitted by the base station 105, may be across SSBs transmitted by the base station 105, or combinations thereof.

Figure 2:
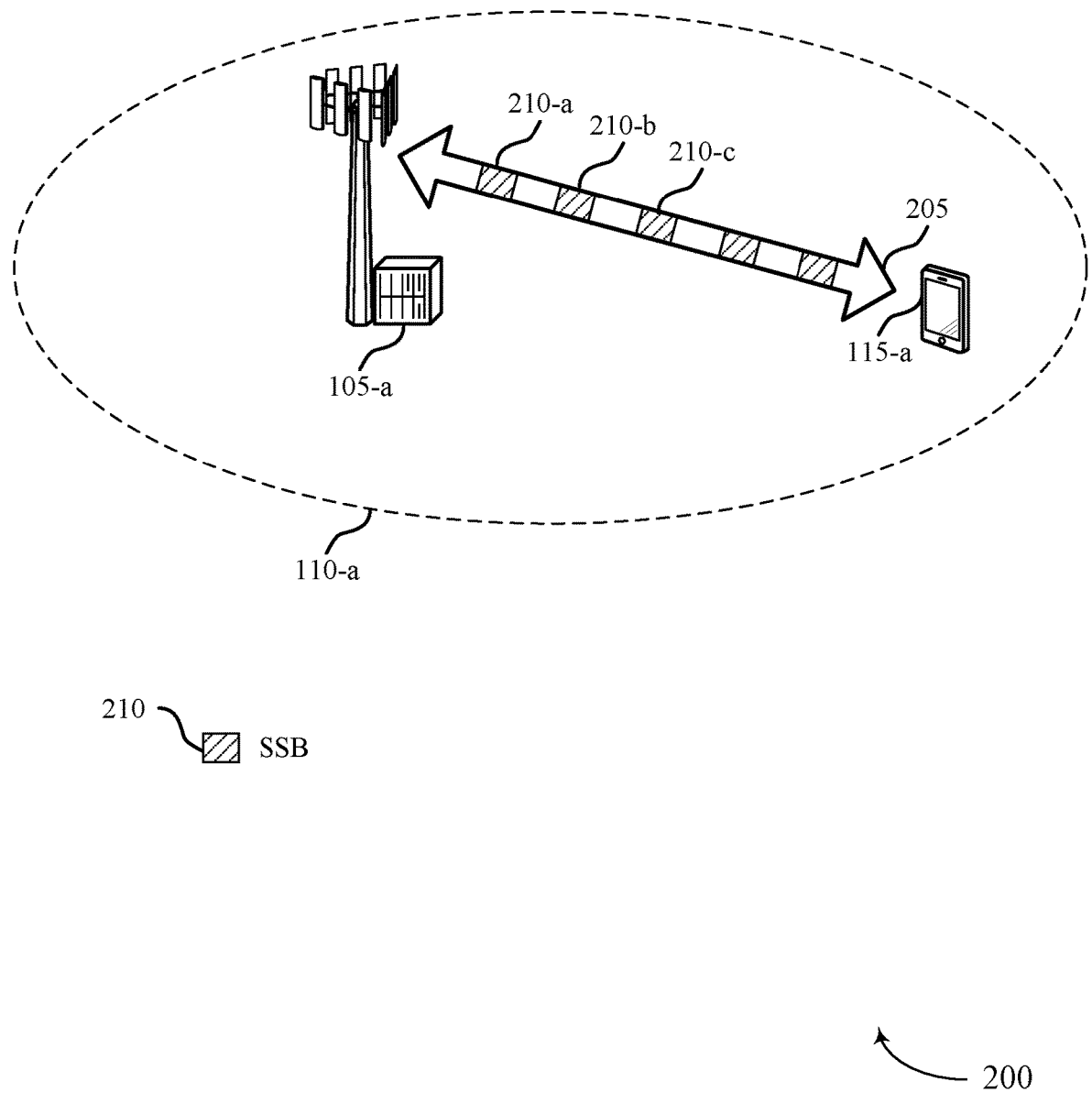
FIG. 2 illustrates an example of a wireless communications system that supports control information combining techniques in wireless communications in accordance with aspects of the present disclosure.

FIG. 2 illustrates an example of a wireless communications system 200 that supports control information combining techniques in wireless communications in accordance with aspects of the present disclosure. In some examples, wireless communications system 200 may implement aspects of wireless communications system 100. In some examples, the wireless communications system 200 may include a base station 105-a and UE 115-a, which may be examples of the corresponding devices as described with reference to FIG. 1. UE 115-a may communicate with the base station 105-a within a coverage area 110-a.

In some examples, the base station 105-a may utilize SSBs 210 to perform cell acquisition procedures with UE 115-a. For example, the UE 115-a may utilize PSS and SSS transmissions within a SSB 210 for synchronizing with a cell. In one example, synchronization signals may be transmitted over a carrier 205 for a cell. The synchronization signals may be conveyed using established synchronization sequences. In some cases, the UE 115-a may receive a synchronization signal (e.g., PSS/SSS) for synchronizing with a cell served by the base station 105-a, and may receive physical broadcast channel (PBCH) information via the SSB2 210. In the example of FIG. 2, the base station 105-a may transmit multiple different SSBs 210, a same SSB multiple times, or combinations thereof, including a first instance of a SSB 210-a, a second instance of a SSB 210-b, and a third instance of a SSB 210-c. In some cases, the SSBs 210 may be used by the UE 115-a for timing synchronization and detection of a cell ID. For example, the UE 115-a may utilize the SSB 210 to determine an ID associated with the cell served by the base station 105-a.

In some cases, as indicated above, in order to enhance the likelihood of successful reception and decoding of such control information, such as RMSI related information, provided via SSBs 210, the base station 105-a may transmit multiple instances of the RMSI related information that may be combined at the UE 115-a, with the combined signal used for decoding of the RMSI related information. In some cases, the base station 105-a may allocate two or more sets of downlink transmission resources for transmission of two or more instances of RMSI related information. The base station 105-a may then transmit, and the UE 115-a may receive, an indication that combining of multiple RMSI related information is supported. The UE 115-a may identify, based on the indication, two or more instances within downlink transmission resources configured for RMSI related information transmissions, combine signals received in each of the two or more instances to generate a combined RMSI related information signal, and decode the combined RMSI related information signal to obtain the RMSI related information.

The base station 105-a may signal, and the UE 115-a may receive, the indication in various manners, e.g., utilizing the resources already available (e.g., a unused tones, a reserved bits) without increasing resource overhead. In some cases, the base station 105-a may transmit, and the UE 115-a may receive, the indication via at least one tone of one or more resource blocks (RBs) that are partially occupied by a synchronization signal. In some cases, the UE 115-a may determine a phase difference between a first reference signal and a second reference signal transmitted within a synchronization signal block (SSB), where a value of the indication from the base station 105-a is identified based on the phase difference. In some cases, the UE 115-a may receive the indication via an information field in a physical broadcast control channel (PBCH) transmission within a SSB. In some cases, the UE 115-a may determine a scrambling sequence of a reference signal associated with a PBCH transmission within a SSB, where a value of the indication from the base station 105-a is identified based on which of a plurality of available scrambling sequences is used to scramble the reference signal. In some cases, the UE 115-a may determine that a flag in a PBCH transmission is set to signal a presence of the indication in a separate extended PBCH transmission, and monitor for the indication in the separate extended PBCH transmission. In some cases, the UE 115-a may receive a first SSB that does not include RMSI transmissions, and decode, from the first SSB, the indication and an identification of at least a second SSB that includes at least one instance of the RMSI related information. In some cases, the UE 115-a may receive configuration information including an index value for a configuration table, and determine, based on configuration table entries associated with the index value, that combining of multiple instances of the RMSI related information is supported in transmissions from the base station 105-a.

Various techniques provided herein provide for signaling from the base station 105-a that indicates multiple instances of RMSI related information may be combined at the UE 115-a. The UE 115-a may receive the indication that multiple instances of RMSI related information are transmitted, may identify downlink transmission resources configured for the RMSI transmission (e.g., based on a multiplexing pattern), and may combine signals received in each of two or more RMSI instances to generate a combined RMSI signal that may be decoded to determine the RMSI related information. In some cases, the base station 105-a may signal the support of RMSI combining using one or more of:

one or more tones in SSBs 210; signaling with PSS/SSS/ PBCH or DMRS phase differences; signaling in a payload of the PBCH; signaling in the PBCH DMRS; signaling in an extended PBCH; signaling in an SSB 210 that does not include RMSI that indicates another SSB 210 that does include multiple instances of RMSI; signaling in an occasion configuration table, or any combination thereof.

Figure 3:
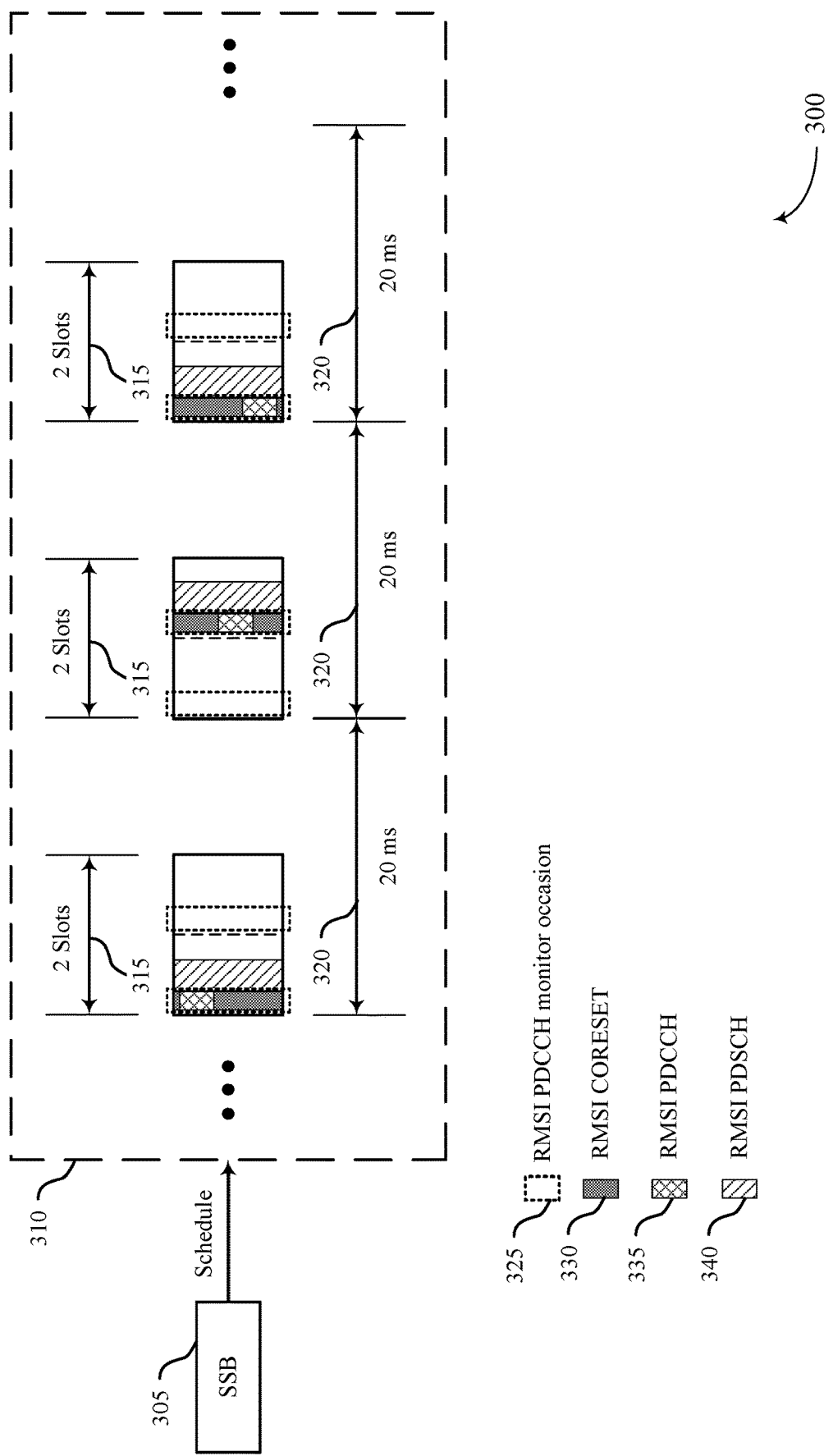
FIG. 3 illustrates an example of SSB resources that support control information combining techniques in wireless communications in accordance with aspects of the present disclosure.

FIG. 3 illustrates an example of a SSB resources 300 that supports control information combining techniques in wireless communications in accordance with aspects of the present disclosure. In some examples, SSB resources 300 may implement aspects of wireless communications system 100. In the example of FIG. 3, SSB 305 may have a schedule configuration 310 that provides a number of periodic RMSI PDCCH monitoring windows 320. In some cases, the PBCH for a given SSB_ID may schedule such periodic RMSI PDCCH monitor windows with period of 20 ms. In some cases, one of a number of available multiplexing patterns may be established for SSB 305. For example, a SSB and RMSI multiplex pattern 1 may provide that each RMSI PDCCH monitoring window 320 has 2 slots 315, and each slot has a RMSI PDCCH monitor occasion 325 where RMSI PDCCH may appear. In other examples, a SSB and RMSI multiplex pattern 2 or 3, may provide that each RMSI PDCCH monitoring window 320 only has a single RMSI PDCCH monitor occasion 325. After decoding PBCH, a UE 115 may look for potential RMSI PDCCH in the indicated RMSI PDCCH monitor occasions 325. The RMSI PDCCH monitor occasions 325, if RMSI is present, may include RMSI CORSET 330 and RMSI PDCCH 335. If RMSI PDCCH 335 is decoded in a RMSI PDCCH monitor occasion 325, it will direct the UE 115 to the scheduled RMSI PDSCH 340 for system information that may be used for initial access.

As discussed above, in order to improve decoding some cell edge UEs (or UEs having relatively poor coverage) may combine RMSI PDCCH 335 across RMSI PDCCH monitor occasions 325 per SSB for decoding. After decoding the combined RMSI PDCCH, the UE 115 may in some cases further combine scheduled RMSI PDSCH for decoding. In some cases, to facilitate RMSI combining across RMSI PDCCH monitor occasion 325 per SSB by the UE, a base station 105 may configure a number of conditions, including providing a same aggregation level and payload for RMSI PDCCH 335 and same payload for RMSI PDSCH 340 across RMSI PDCCH monitoring window 320 (e.g., 8 windows per 160 ms RMSI TTI; where sequence frame numbers (SFNs) may be specified for start and end per RMSI TTI, such as mod(SFN,16)=0 and 15). In such cases, RMSI PDCCH 335 may appear once in every X windows (e.g., X=1). For multiplex pattern 1, RMSI PDCCH may appear in either RMSI PDCCH monitor occasion 325 per RMSI PDCCH monitoring window 320 or at least in a fixed RMSI PDCCH monitor occasion 325 that is predefined (e.g., in a first RMSI PDCCH monitor occasion 325 per RMSI PDCCH monitoring window 320). In some cases, RMSI PDCCH 335 frequency locations may be different in different RMSI PDCCH monitor occasions 325. In some cases, the UE 115 may identify a frequency hopping pattern to determine the frequency locations. Such a frequency hopping pattern may be predefined in some cases (e.g., as a function of RMSI PDCCH monitoring window 320 index, SSB index, cell ID, SFN, a RMSI PDCCH monitor occasion 325 first slot/symbol index in the frame/slot, RMSI sub-carrier spacing (SCS), or any combination thereof). Additionally or alternatively, RMSI PDCCH 335 may be combined across different SSBs, as will be discussed with reference to FIG. 4 for some examples.

Figure 4:
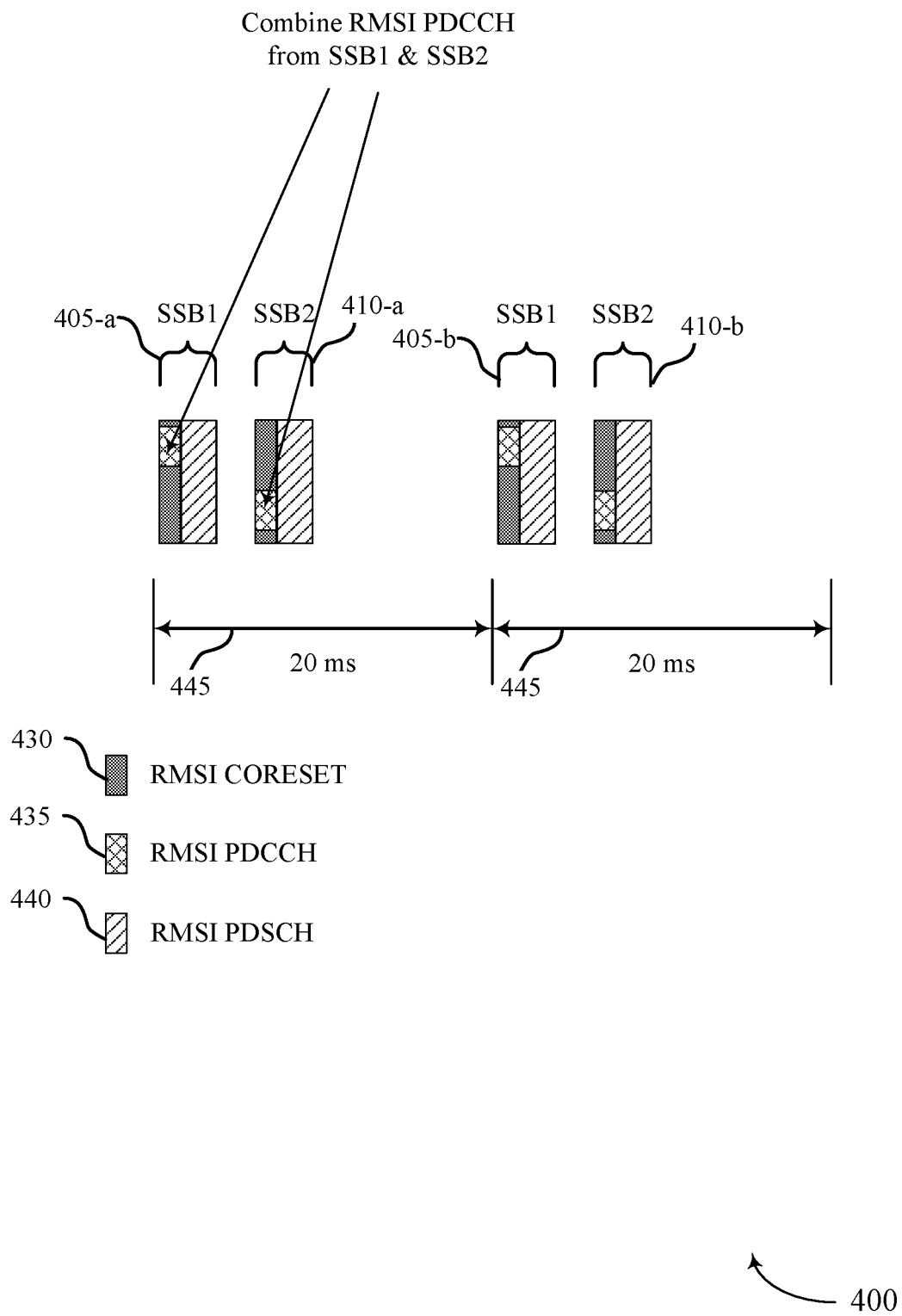
FIG. 4 illustrates an example of a RMSI combining pattern that supports control information combining techniques in wireless communications in accordance with aspects of the present disclosure.

FIG. 4 illustrates an example of a RMSI combining pattern 400 that supports control information combining techniques in wireless communications in accordance with aspects of the present disclosure. In some examples, RMSI combining pattern 400 may implement aspects of wireless communications system 100. In the example of FIG. 4, a first SSB 405-a and a second SSB 405-b may each include a RMSI CORESET 430, RMSI PDCCH 435, and RMSI PDSCH 440. In this example, an SSB configuration may provide that each of the two SSBs 405 are provided once per monitoring window 445. Similarly as discussed above, in some cases the PBCH for a given SSB_ID may schedule such periodic RMSI PDCCH monitor windows with period of 20 ms.

In cases where different SSBs 405 are transmitted, RMSI combining may be provided across SSBs. Thus, to help improve decoding rates for cell edge UEs, RMSI PDCCH 435 for different SSBs 405 may be combined for decoding in each 20 ms monitoring window 445 period. After decoding RMSI PDCCH 435, the UE 115 may further combine scheduled RMSI PDSCH 440 for decoding. To facilitate RMSI combining across SSBs in each RMSI PDCCH 435 in a monitoring window 445 period by a UE 115, cell or base station 105 may configure a same aggregation level and payload for RMSI PDCCH 435 and same payload for RMSI PDSCH 440 across SSBs 405 in each monitoring window 445 period. Further, SFNs may be defined for start and end per monitoring window 445 period (e.g., mod(SFN,2)=0 and 1). In cases where RMSI PDCCH 435 is combined across SSBs 405, the RMSI PDCCH 435 may be scheduled to appear once in every monitor window period.

Similarly as discussed above, in some cases, RMSI PDCCH 435 frequency locations may be different in different SSBs 405. In some cases, the UE 115 may identify a frequency hopping pattern to determine the frequency locations. Such a frequency hopping pattern may be predefined in some cases (e.g., as a function of monitoring window 445 index, SSB index, cell ID, SFN, a monitoring occasion first slot/symbol index in the frame/slot, RMSI sub-carrier spacing (SCS), or any combination thereof).

As discussed above, various techniques provided herein provide for signaling from a base station 105 to provide an indication that multiple instances of RMSI related information, which may include RMSI PDCCH information (e.g., RMSI scheduling information for the RMSI transmission), RMSI PDSCH information (e.g., a payload of the RMSI transmission), or combinations thereof, may be combined at the UE. When referring to RMSI or RMSI related information herein, it is to be understood that reference is made to RMSI PDCCH information, RMSI PDSCH information, or combinations thereof. The UE 115 may receive the indication that multiple instances of RMSI related information are transmitted, may identify downlink transmission resources configured for the RMSI transmission (e.g., based on a multiplexing pattern), and may combine signals received in each of two or more RMSI instances to generate a combined RMSI signal that may be decoded to determine the RMSI related information. In some cases, the base station 105-a may signal the support of RMSI combining using one or more tones in SSBs. One example of such signaling is illustrated in FIG. 5.

Figure 5:
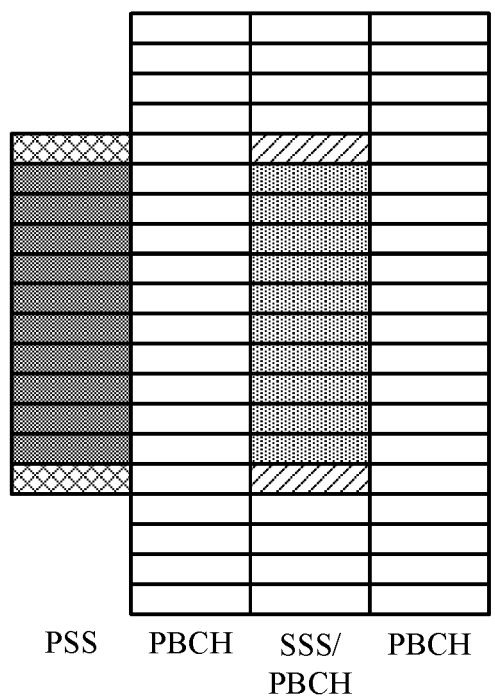
FIG. 5 illustrates an example of a SSB control channel that supports control information combining techniques in wireless communications in accordance with aspects of the present disclosure.
Figure 5:
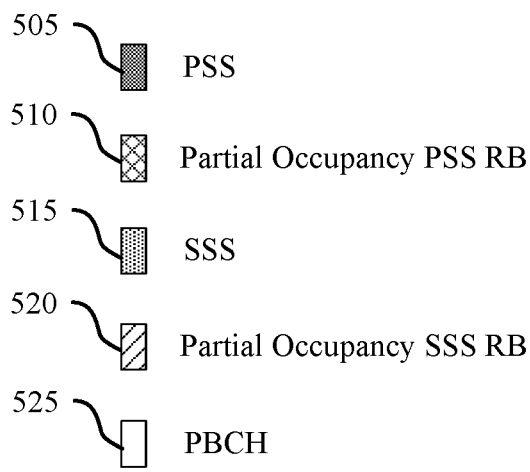

FIG. 5 illustrates an example of a SSB control channel 500 that supports control information combining techniques in wireless communications in accordance with aspects of the present disclosure. In some examples, SSB control channel 500 may implement aspects of wireless communications system 100. In this example, a SSB PDCCH may include four OFDM symbols, and contain a PSS 505, an SSS 515, and PBCH 525 information.

In some examples, the PSS 505 and SSS 515 may only partially occupy certain resource blocks (RBs). As illustrated in FIG. 5, a first OFDM symbol may have two partial occupancy PSS RBs 510, and a third OFDM symbol may also have two partial occupancy SSS RBs 520. Partial occupancy RBs may be the result of unused tones in an RB that contains some synchronization signal tones. For example, in some deployments there may be a total 17 unused tones in partial occupancy SSS RBs 520, and also 17 unused tones in partial occupancy PSS RBs 510, which may be divided between RBs at a beginning and an end of the respective synchronization signal. In some examples, at least a subset of these unused tones are used to signal a one bit or two bit indicator of supporting RMSI combining per SSB and/or across SSBs.

In other examples, a base station 105 may signal that a UE 115 may perform RMSI combining via a reference signal phase difference. For example, PSS 505, SSS 515, and a DMRS transmitted with PBCH 525 may have phase differences that may indicate support of RMSI combining. A phase term may be multiplied to any one of the reference signal transmissions and may carry a one-bit or two-bit indicator of supporting RMSI combining per SSB and/or across SSBs. Assuming that a receive channel at the UE 115 is nearly constant over the SSB, the UE 115 may retrieve the indicator by computing the phase differential between the reference signal carrying the indicator and one of the reference signals that is not carrying the indicator. In some cases, the reference signal carrying the indicator may be predefined or provided to the UE 115 in system information or in a configuration.

In other examples, a base station 105 may signal that a UE 115 may perform RMSI combining via signaling within the PBCH 525 payload. In such cases, reserved bits in the PBCH 525 may carry the one-bit or two-bit indicator of supporting RMSI combining per SSB and/or across SSBs. The UE 115, upon decoding the PBCH, may identify the value of the indicator and determine whether RMSI combining may be used.

In further examples, a base station 105 may signal that a UE 115 may perform RMSI combining via signaling in a DMRS transmitted with the PBCH 525. In such cases, a DMRS scrambling sequence initialization seed can be defined as a function of the one-bit or two-bit indicator, and the PBCH DMRS scrambled in accordance with a scrambling sequence generated based on the initialization seed. The UE 115, upon receiving the PBCH DMRS, may determine the scrambling sequence that was used for the DMRS, which may be mapped to the one-bit or two-bit indicator. For example, the base DMRS sequence may be a known sequence, and the scrambling sequence may be determined based on a difference between a received DMRS sequence and the base DMRS sequence. The scrambling sequence may be determined based on this difference as one sequence of a predetermined number of potential sequences that are each mapped to an indicator value for the RMSI combining.

Figure 6:
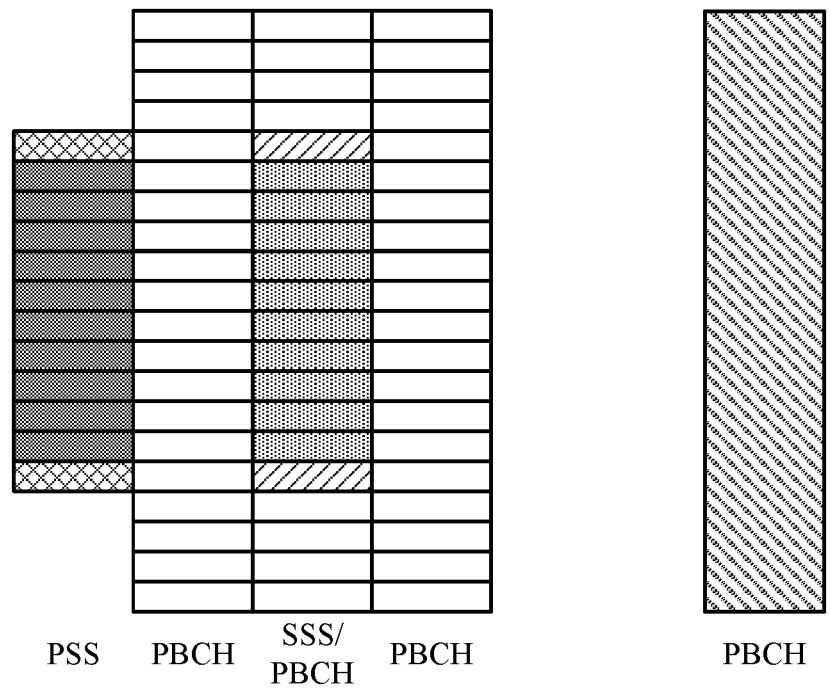
FIG. 6 illustrates another example of a SSB control channel that supports control information combining techniques in wireless communications in accordance with aspects of the present disclosure.
Figure 6:
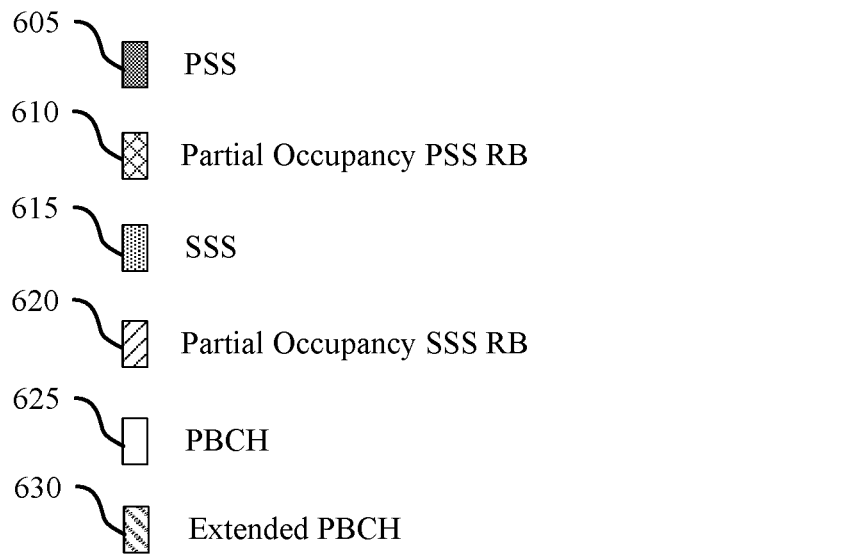

In still further examples, an indication of RMSI combining may be provided in a control channel transmission. FIG. 6 illustrates an example of a SSB control channel 600 that supports control information combining techniques in wireless communications in accordance with aspects of the present disclosure. In some examples, SSB control channel 600 may implement aspects of wireless communications system 100. In this example, a SSB PDCCH may include an initial four OFDM symbols, and contain a PSS 605, an SSS 615, and PBCH 625 information. In this example, partial occupancy PSS RBs 610 and partial occupancy SSS RBs 620 may also be present similarly as discussed above, but not used to transmit the indication. In this example, extended PBCH 630 resources may be transmitted, which may include the indication.

In such cases, the base station 105 may use a reserved bit in the initial PBCH 625 to signal the presence of the extended PBCH 630. In some cases, the resources and format of the extended PBCH 630 may be defined such that the UE 115 can receive and decode the extended PBCH 630. The extended PBCH 630 in such cases may carry, among other things, the one-bit or two-bit indicator of whether RMSI combining per SSB and/or across SSBs may be used by the UE.

Figure 7:
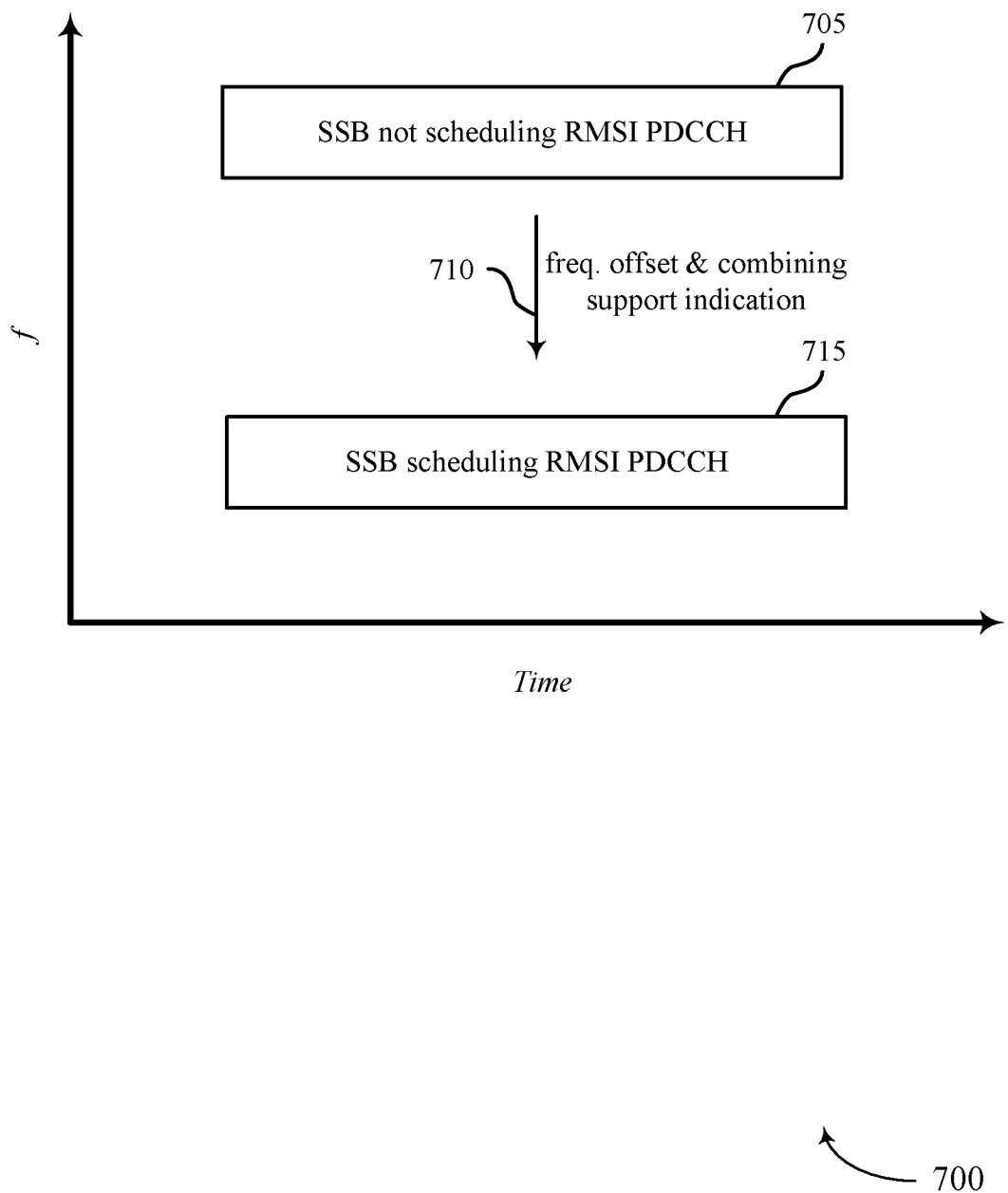
FIG. 7 illustrates an example of a SSB indication that supports control information combining techniques in wireless communications in accordance with aspects of the present disclosure.

In still further examples, one SSB may provide an indication that another SSB may be used for RMSI combining. FIG. 7 illustrates an example of a SSB indication 700 that supports control information combining techniques in wireless communications in accordance with aspects of the present disclosure. In some examples, SSB indication 700 may implement aspects of wireless communications system 100. In this example, a first SSB 705 may provide an indication 710 that a second SSB 715 may be used by the UE 115 for RMSI combining.

In this example, the first SSB 705 may not schedule RMSI transmissions. In such a case, the first SSB 705 that does not schedule RMSI may provide a PBCH transmission that may indicate no scheduled RMSI PDCCH are present in the first SSB 705 and may indicate a frequency offset of the second SSB 715 that does schedule RMSI PDCCH. A UE 115 receiving such an indication 710 may use the frequency offset information to identify wireless resources of the second SSB 715, and indication 710 may provide an indication of whether the UE 115 may use RMSI combining for the second SSB 715. In some cases, reserved bits in the PBCH of the first SSB 705 may be used to indicate the one-bit or two-bit indicator of supporting RMSI combining per SSB and/or across SSBs for the second SSB 715 that schedules RMSI.

In some further examples, a signaling to an occasion configuration table may be provided to indicate whether RMSI combining within a SSB and/or across SSBs is configured. An example occasion configuration table is provided below in Table 1. In this example, for multiplex pattern 1, a new column is added to the corresponding RMSI PDCCH monitor occasion configuration table. In the exemplary table, "1" means for corresponding occasion configuration (e.g., configurations 4 or 9) supporting cells will ensure all conditions are satisfied (e.g., aggregation level, payload, SFNs) to support RMSI combining per SSB and/or across SSBs. In some cases, to eliminate blind decoding, in those selected configurations, it may be defined that RMSI PDCCH always and only appears in one occasion per window (e.g., in a first monitoring occasion in a window)

TABLE 1

Parameters for PDCCH monitoring occasions for Type0-PDCCH
common search space - SS/PBCH block and control resource
set multiplexing pattern 1 and frequency range 2

| Index | O | Number of search space sets per slot | M | First symbol index | PDCCH Combining enabled |
|---|---|---|---|---|---|
| 0 | 0 | 1 | 1 | 0 | 0 |
| 1 | 0 | 2 | 1/2 | {0, if is even}, {7, if is odd} | 0 |
| 2 | 2.5 | 1 | 1 | 0 | 0 |
| 3 | 2.5 | 2 | 1/2 | {0, if is even}, {7, if is odd} | 0 |
| 4 | 5 | 1 | 1 | 0 | 1 |
| 5 | 5 | 2 | 1/2 | {0, if is even}, {7, if is odd} | 0 |
| 6 | 0 | 2 | 1/2 | {0, if is even}, { , if is odd} | 0 |
| 7 | 2.5 | 2 | 1/2 | {0, if is even}, { , if is odd} | 0 |
| 8 | 5 | 2 | 1/2 | {0, if is even}, { , if is odd} | 0 |
| 9 | 7.5 | 1 | 1 | 0 | 1 |
| 10 | 7.5 | 2 | 1/2 | {0, if is even}, {7, if is odd} | 0 |
| 11 | 7.5 | 2 | 1/2 | {0, if is even}, { , if is odd} | 0 |
| 12 | 0 | 1 | 2 | 0 | 0 |
| 13 | 5 | 1 | 2 | 0 | 0 |
| 14 | | | | Reserved | |
| 15 | | | | Reserved | |

In cases where such a configuration table is used, the UE 115 may attempt one-shot decoding. If such one-shot decoding fails, the UE 115 may attempt RMSI PDCCH combining if the signaled configuration has a "1" in the last column of the table. If the RMSI PDCCH combining fails, the UE 115 may detect the cell is a legacy cell that does not support combining support if a DMRS RSRP of every combined PDCCH is above a threshold (e.g., a corresponding packet error rate (PER)<10%). In such cases, the UE 115 may refrain from further combining on this cell a configured time period (e.g., for at least X days, where X is configurable, such as three days).

Figure 8:
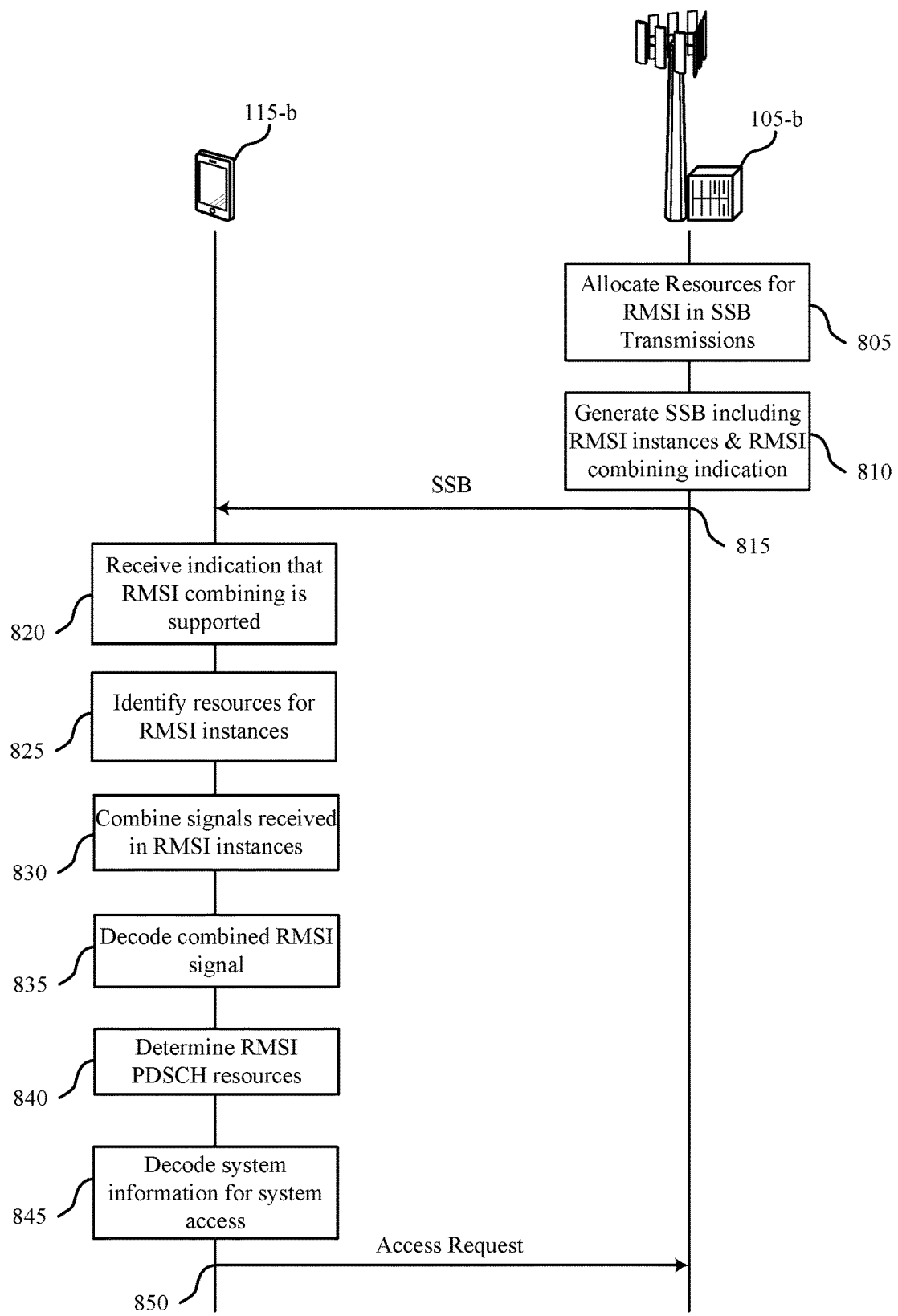
FIG. 8 illustrates an example of a process flow that supports control information combining techniques in wireless communications in accordance with aspects of the present disclosure.

FIG. 8 illustrates an example of a process flow 800 that supports control information combining techniques in wireless communications in accordance with aspects of the present disclosure. In some examples, process flow 800 may implement aspects of wireless communications system 100 or 200. In this example, process flow 800 includes UE 115-b and base station 105-b, which may examples of the corresponding devices described with reference to FIGS. 1 and 2.

At 805, the base station 105-b may allocate resources for RMSI in SSB transmissions. In some cases, the resources may include resources for multiple instances of RMSI transmissions that are allocated within a particular SSB (e.g., in a SSB that may be transmitted in multiple monitoring windows within a SSB transmission time interval (TTI). In some cases, the resources may include resources for multiple instances of RMSI transmissions that are transmitted in different SSBs. In some cases, the RMSI transmissions may include multiple instances of the same RMSI to be transmitted within a SSB and across different SSBs.

At 810, the base station 105-b may generate one or more SSBs including multiple RMSI instances and a combining indication. In some cases, the one or more RMSI instances may include a same aggregation level and payload. In some cases, multiple instances of a RMSI PDSCH may be transmitted, which have a same payload and may be combined at the UE 115-b. In some cases, the RMSI instances (RMSI PDCCH instances, RMSI PDSCH instances, or both) may be transmitted across a RMSI PDCCH monitoring window (e.g., 8 windows per 160 ms RMSI TTI; where sequence frame numbers (SFNs) may be specified for start and end per RMSI TTI, such as mod(SFN,16)=0 and 15). In such cases, RMSI PDCCH may appear once in every X windows (e.g., X=1). For multiplex pattern 1, RMSI PDCCH may appear in either monitor occasion per window or at least in a fixed monitor occasion that is predefined (e.g., in a first monitor occasion per window). In some cases, RMSI PDCCH frequency locations may be different in different monitor occasions, and the UE 115-b may identify a frequency hopping pattern to determine the frequency locations. Such a frequency hopping pattern may be predefined in some cases (e.g., as a function of window index, SSB index, cell ID, SFN, a monitoring occasion first slot/symbol index in the frame/slot, RMSI sub-carrier spacing (SCS), or any combination thereof).

At 815, the base station 105-b may transmit the SSB transmissions, including multiple instances of RMSI, as discussed above. The SSB may also include the indication that the multiple RMSI instances may be combined at the UE 115-b. In some cases, the indication may be a one-bit indication that indicates that multiple RMSI instances may be combined within a SSB. In some cases, the indication may be a one-bit indication that indicates that multiple RMSI instances may be combined across different SSBs. In some cases, the indication may be a two bit indication that indicated whether RMSI instances may be combined within a SSB (e.g., a "0,0" indication), across different SSBs (e.g., a "0,1" indication), or both within a SSB and across different SSBs (e.g., a "1,0" or a "1,1" indication).

At 820, the UE 115-b may receive the indication that RMSI combining is supported. As indicated above, the indication may be a one-bit or a two-bit indication that RMSI combining is supported by the base station 105-b within a SSB, across SSBs, or both. In some cases, as discussed above, the indication may be provided using one or more of: one or more tones in SSBs; signaling with PSS/SSS/PBCH or DMRS phase differences; signaling in a payload of the PBCH; signaling in the PBCH DMRS; signaling in an extended PBCH; signaling in an SSB that does not include RMSI that indicates another SSB that does include multiple instances of RMSI; signaling in an occasion configuration table, or any combination thereof.

At 825, the UE 115-b may identify resources for RMSI instances. In some cases, the resources may be identified from one or more RMSI monitoring occasions. In some cases, the identified resources may be within different instances of an SSB or across multiple SSBs. In some cases, the resources for RMSI instances may be identified based on a multiplexing pattern that is used for SSB transmissions. In some cases, a frequency hopping pattern may be used for RMSI instances, which may be predefined in some cases (e.g., as a function of RMSI PDCCH monitoring window 320 index, SSB index, cell ID, SFN, a RMSI PDCCH monitor occasion 325 first slot/symbol index in the frame/slot, RMSI sub-carrier spacing (SCS), or any combination thereof).

At 830, the UE 115-b may combine signals received in multiple of the identified RMSI instances. In some cases, the UE 115-b may store received signals of a first RMSI instance in a soft combining buffer, and add corresponding received signals from a second RMSI instance to the soft combining buffer. In cases where more than two instances of RMSI are combined, such additional instances may be added to the soft-combining buffer upon receipt.

At 835, the UE 115-b may attempt to decode the combined RMSI signals to obtain the RMSI related information. In some cases, a decoder may attempt to decode the RMSI related information and provide the bits corresponding to the RMSI related information output to a processor that may identify one or more fields within the RMSI related information.

At 840, the UE 115-*b* may determine RMSI PDSCH resources. In some cases, the RMSI related information decoded at 835 may be RMSI PDCCH information, and one or more fields within this information may provide an indication of RMSI PDSCH resources. The RMSI PDSCH resources may include, for example, one or more parameters that may be used by the UE 115-*b* to access the wireless communications system through the base station 105-*b*. In some cases, the UE 115-*b* may combine multiple instances of RMSI PDSCH resources and decode the combined RMSI PDSCH resources.

At 845, the UE 115-*b* may decode system information for system access from the RMSI PDSCH. In some cases, the system information may include parameters to be used for initial system access by the UE 115-*b*.

At 850, the UE 115-*b* may transmit an access request to the base station 105-*b*. In some cases, the access request may be transmitted using parameters that are determined based on the RMSI that is decoded from multiple combined instances of the RMSI. In some cases, the access request may be a random access channel (RACH) message 1 transmission for a random access request to the base station 105-*b*. In some cases, one or more of a preamble of the message 1 transmission, resources for the message 1 transmission, or combinations thereof, may be transmitted as part of the access request to the base station 105-*b*.

Figure 9:
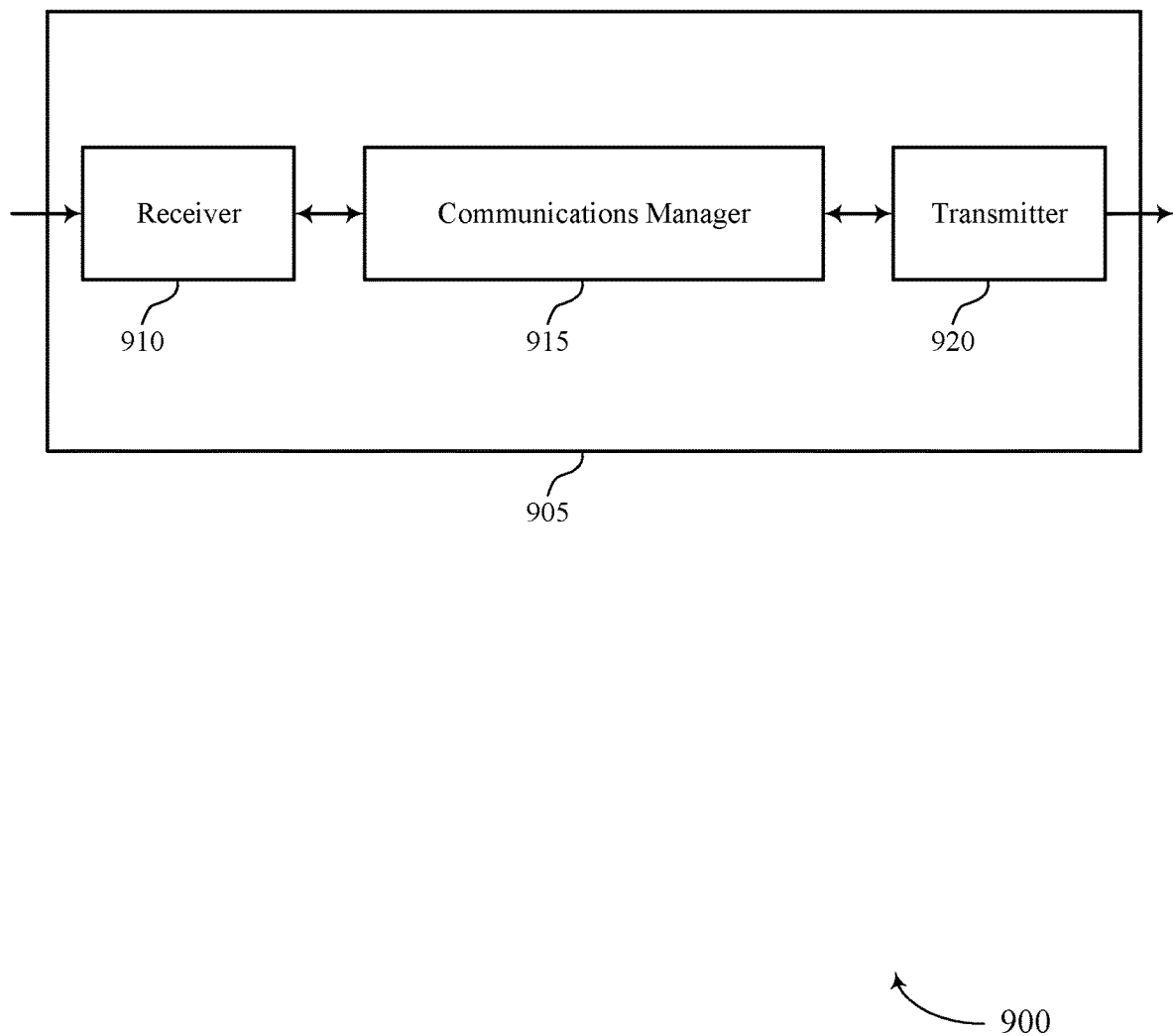
FIGS. 9 and 10 show block diagrams of devices that support control information combining techniques in wireless communications in accordance with aspects of the present disclosure.

FIG. 9 shows a block diagram 900 of a device 905 that supports control information combining techniques in wireless communications in accordance with aspects of the present disclosure. The device 905 may be an example of aspects of a UE 115 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to control information combining techniques in wireless communications, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive, from a base station, an indication that combining of multiple instances of remaining minimum system information (RMSI) related information is supported, identify, based on the indication, two or more instances within downlink transmission resources configured for RMSI related information transmissions, combine signals received in each of the two or more instances to generate a combined RMSI related information signal, and decode the combined RMSI related information signal to obtain the RMSI related information. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
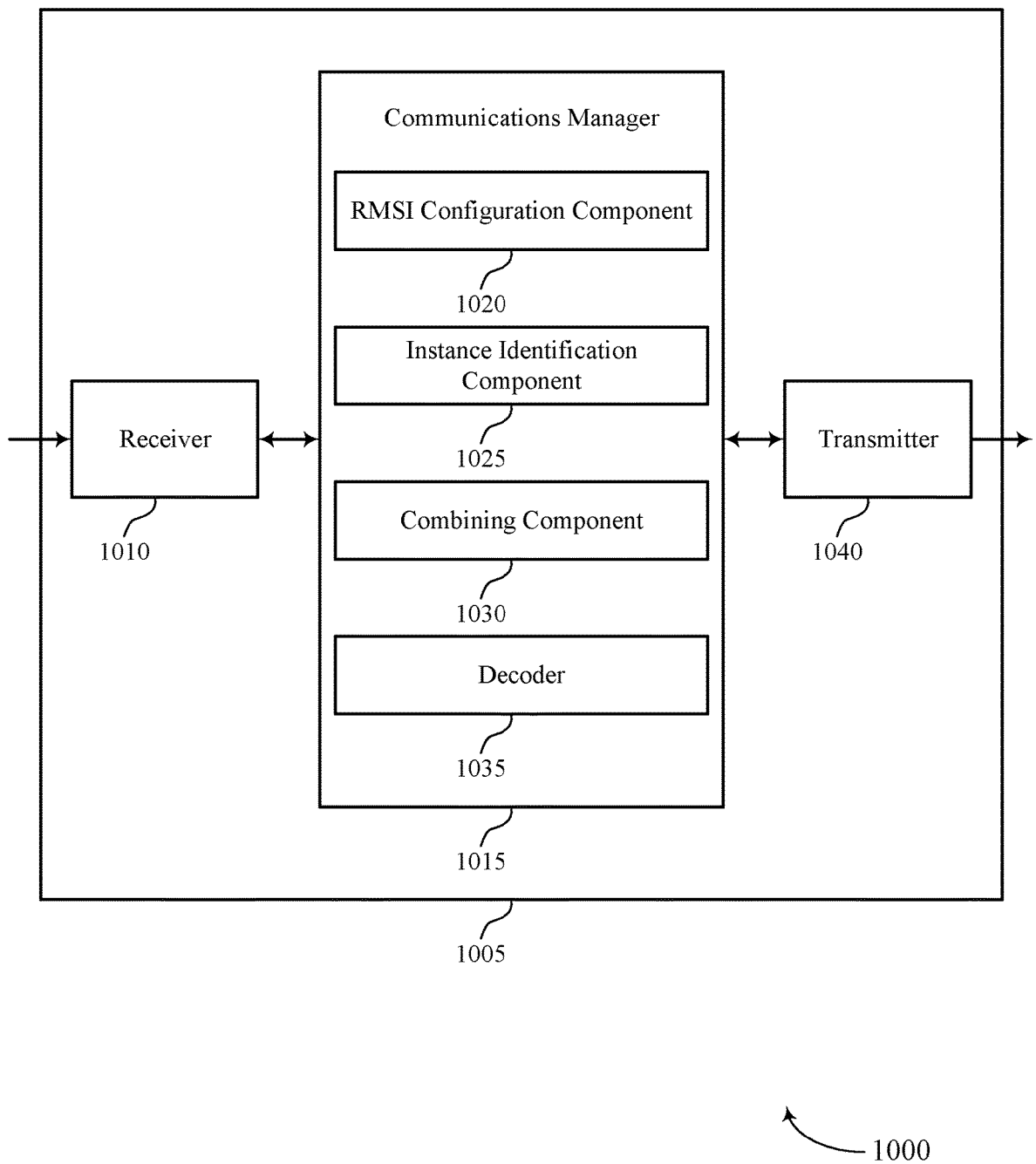

FIG. 10 shows a block diagram 1000 of a device 1005 that supports control information combining techniques in wireless communications in accordance with aspects of the present disclosure. The device 1005 may be an example of aspects of a device 905 or a UE 115 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to control information combining techniques in wireless communications, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a RMSI configuration component 1020, an instance identification component 1025, a combining component 1030, and a decoder 1035. The communications manager 1015 may be an example of aspects of the communications manager 1210 described herein.

The RMSI configuration component 1020 may receive, from a base station, an indication that combining of multiple instances of RMSI related information is supported. In some cases, the indication may be provided using one or more of the techniques as discussed herein for providing such an indication.

The instance identification component 1025 may identify, based on the indication, two or more instances within downlink transmission resources configured for RMSI related information transmissions. In some cases, the two or more instances may be identified within monitoring occasions for RMSI related information within an SSB. In some cases, the two or more instances may span different SSBs.

The combining component 1030 may combine signals received in each of the two or more instances to generate a combined RMSI related information signal. In some cases, the combining component may use a soft buffer to store received signals form wireless resources that are configured for multiple RMSI instances. The decoder 1035 may decode the combined RMSI related information signal to obtain the RMSI related information.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
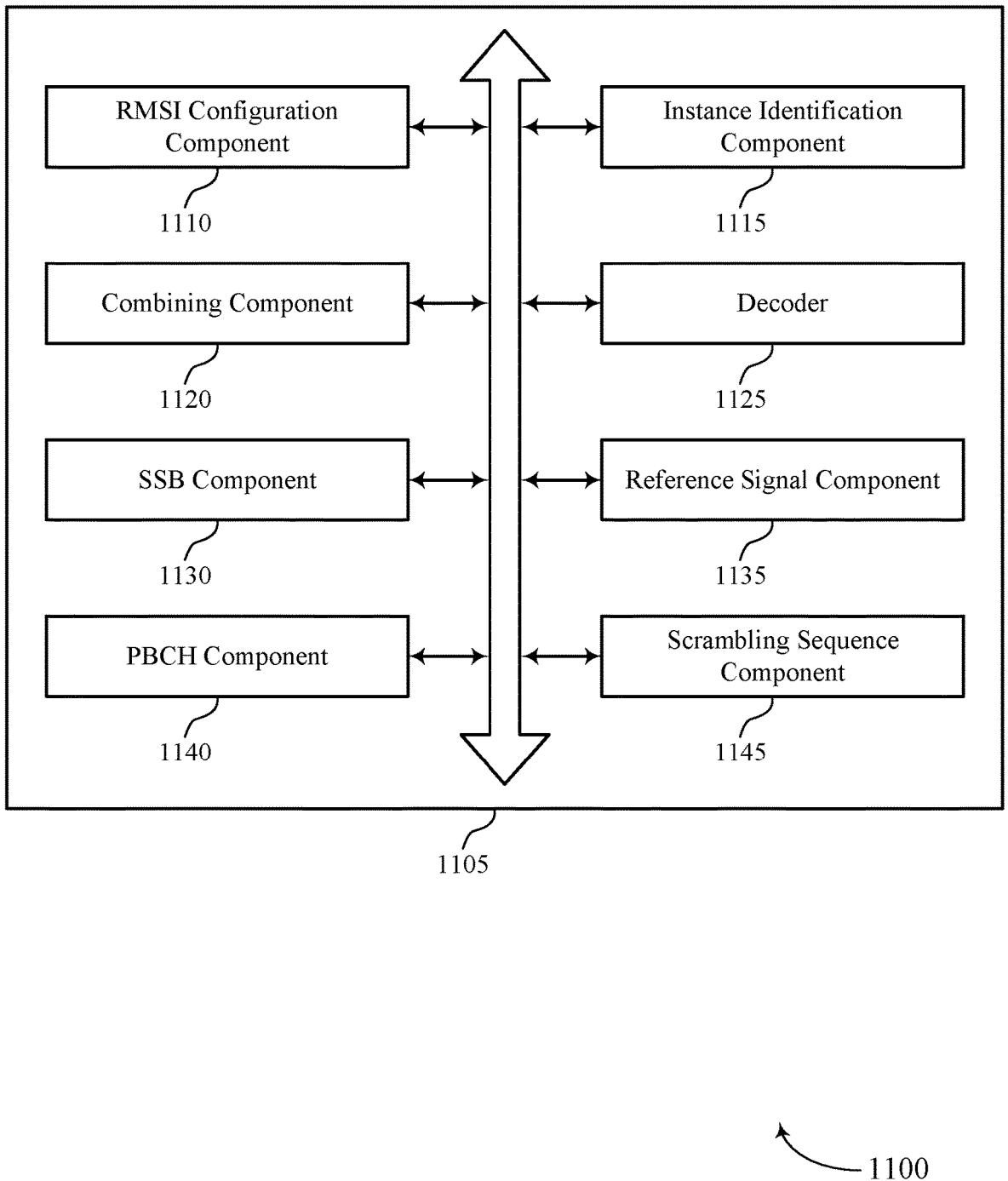
FIG. 11 shows a block diagram of a device that supports control information combining techniques in wireless communications in accordance with aspects of the present disclosure.

FIG. 11 shows a block diagram 1100 of a communications manager 1105 that supports control information combining techniques in wireless communications in accordance with aspects of the present disclosure. The communications manager 1105 may be an example of aspects of a communications manager 915, a communications manager 1015, or a communications manager 1210 described herein. The communications manager 1105 may include a RMSI configuration component 1110, an instance identification component 1115, a combining component 1120, a decoder 1125, a SSB component 1130, a reference signal component 1135, a PBCH component 1140, and a scrambling sequence component 1145. Each of these modules may communicate, directly or indirectly, with one another (e.g., via one or more buses).

The RMSI configuration component 1110 may receive, from a base station, an indication that combining of multiple instances of RMSI related information is supported. In some cases, the indication may be provided using one or more of the techniques as discussed herein for providing such an indication. In some examples, the RMSI configuration component 1110 may receive configuration information including an index value for a configuration table. In some cases, the configuration table further indicates downlink transmission resources associated with the two or more instances of the RMSI related information.

The instance identification component 1115 may identify, based on the indication, two or more instances within downlink transmission resources configured for RMSI related information transmissions. In some cases, the two or more instances within downlink transmission resources configured for RMSI related information transmissions include two or more resources scheduled by a PBCH or a PDCCH associated with a given SSB ID, two or more resources scheduled by the PBCH or the PDCCH associated with different SSB IDs, or any combination thereof.

The combining component 1120 may combine signals received in each of the two or more instances to generate a combined RMSI related information signal. In some cases, the combining component may use a soft buffer to store received signals form wireless resources that are configured for multiple RMSI instances.

The decoder 1125 may decode the combined RMSI related information signal to obtain the RMSI related information. In some examples, the decoder 1125 may determine that the decoding of the combined RMSI signal to obtain the RMSI related information is unsuccessful. In some examples, the decoder 1125 may attempt to decode the RMSI related information signal from only a first instance configured for RMSI related information transmissions based on a signal quality of the downlink transmission associated with the first instance being above a threshold value.

The SSB component 1130 may receive the indication via at least one tone of one or more resource blocks (RBs) that are partially occupied by a synchronization signal. In some examples, the SSB component 1130 may receive a first synchronization signal block (SSB) that does not include RMSI related information transmissions. In some examples, the SSB component 1130 may decode, from the first SSB, the indication and an identification of at least a second SSB that includes at least on instance of the RMSI related information. In some cases, the at least one tone provides at least a one bit indicator via one or more RBs that are partially occupied by a PSS, a SSS, or combinations thereof. In some cases, the receiving the identification of at least the second SSB includes a frequency offset of the second SSB relative to the first SSB.

The reference signal component 1135 may determine a phase difference between a first reference signal and a second reference signal transmitted within a synchronization signal block (SSB), where a value of the indication from the base station 105 is identified based on the phase difference. In some cases, the first reference signal is a demodulation reference signal (DMRS) associated with a PSS transmitted within the SSB, and the second reference signal is a DMRS associated with a SSS transmitted within the SSB.

The PBCH component 1140 may receive the indication via an information field in a physical broadcast control channel (PBCH) transmission within a synchronization signal block (SSB). In some examples, the PBCH component 1140 may determine that a flag in a physical broadcast control channel (PBCH) transmission is set to signal a presence of the indication in a separate extended PBCH transmission. In some examples, the PBCH component 1140 may monitor for the indication in the separate extended PBCH transmission. In some cases, the separate extended PBCH transmission is transmitted by the base station 105 via predefined wireless resources associated with a synchronization signal block (SSB).

The scrambling sequence component 1145 may determine a scrambling sequence of a reference signal associated with a physical broadcast control channel (PBCH) transmission within a synchronization signal block (SSB), where a value of the indication from the base station 105 is identified based on which of a set of available scrambling sequences is used to scramble the reference signal.

Figure 12:
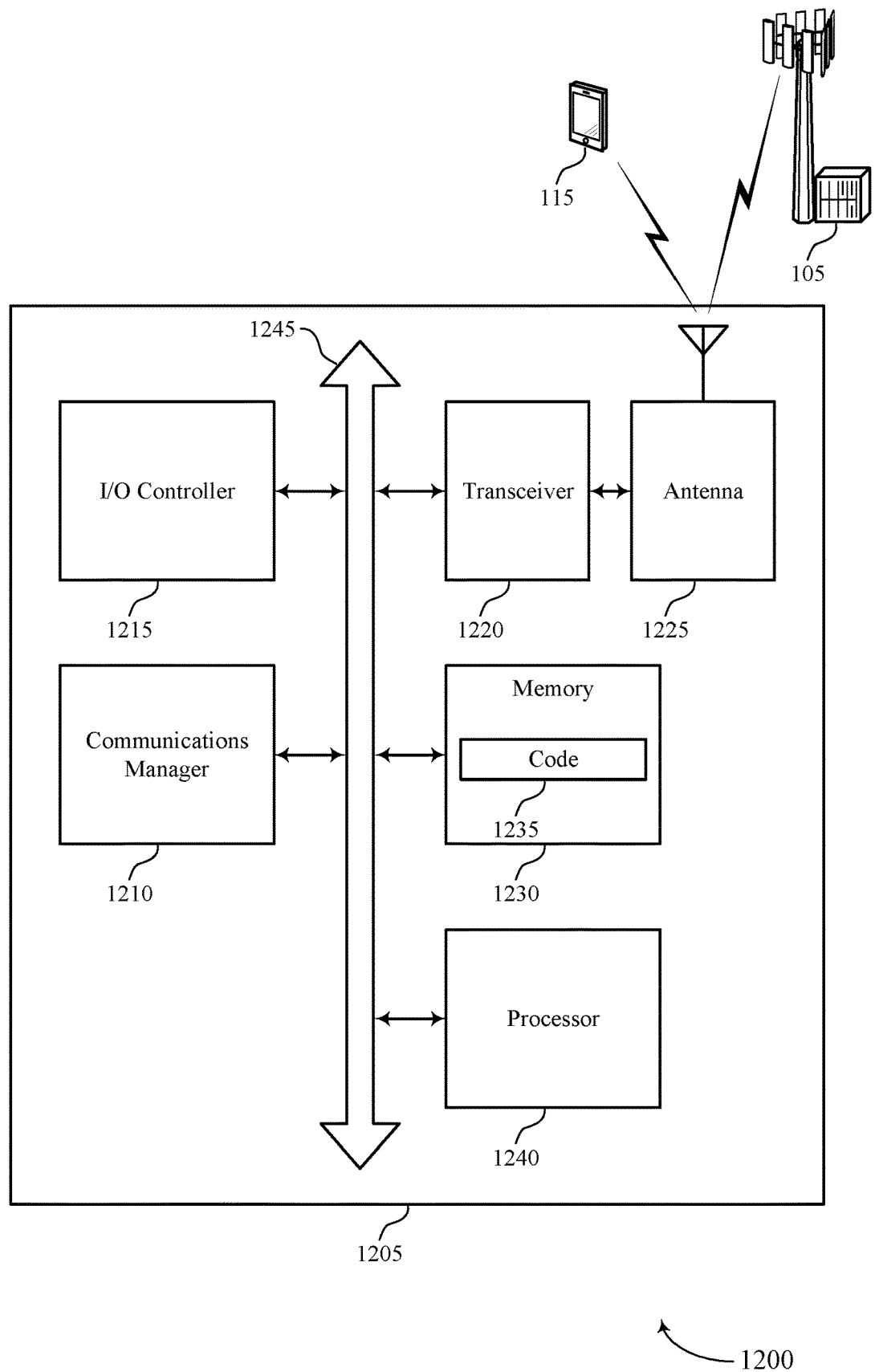
FIG. 12 shows a diagram of a system including a device that supports control information combining techniques in wireless communications in accordance with aspects of the present disclosure.

FIG. 12 shows a diagram of a system 1200 including a device 1205 that supports control information combining techniques in wireless communications in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may receive, from a base station, an indication that combining of multiple instances of remaining minimum system information (RMSI) related information is supported, identify, based on the indication, two or more instances within downlink transmission resources configured for RMSI related information transmissions, combine signals received in each of the two or more instances to generate a combined RMSI related information signal, and decode the combined RMSI related information signal to obtain the RMSI related information.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device 1205 may include a single antenna 1225. However, in some cases the device 1205 may have more than one antenna 1225, which may be capable of concurrently transmitting or receiving multiple wireless transmissions.

The memory 1230 may include RAM and ROM. The memory 1230 may store computer-readable, computer-executable code 1235 including instructions that, when executed, cause the processor to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting control information combining techniques in wireless communications).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
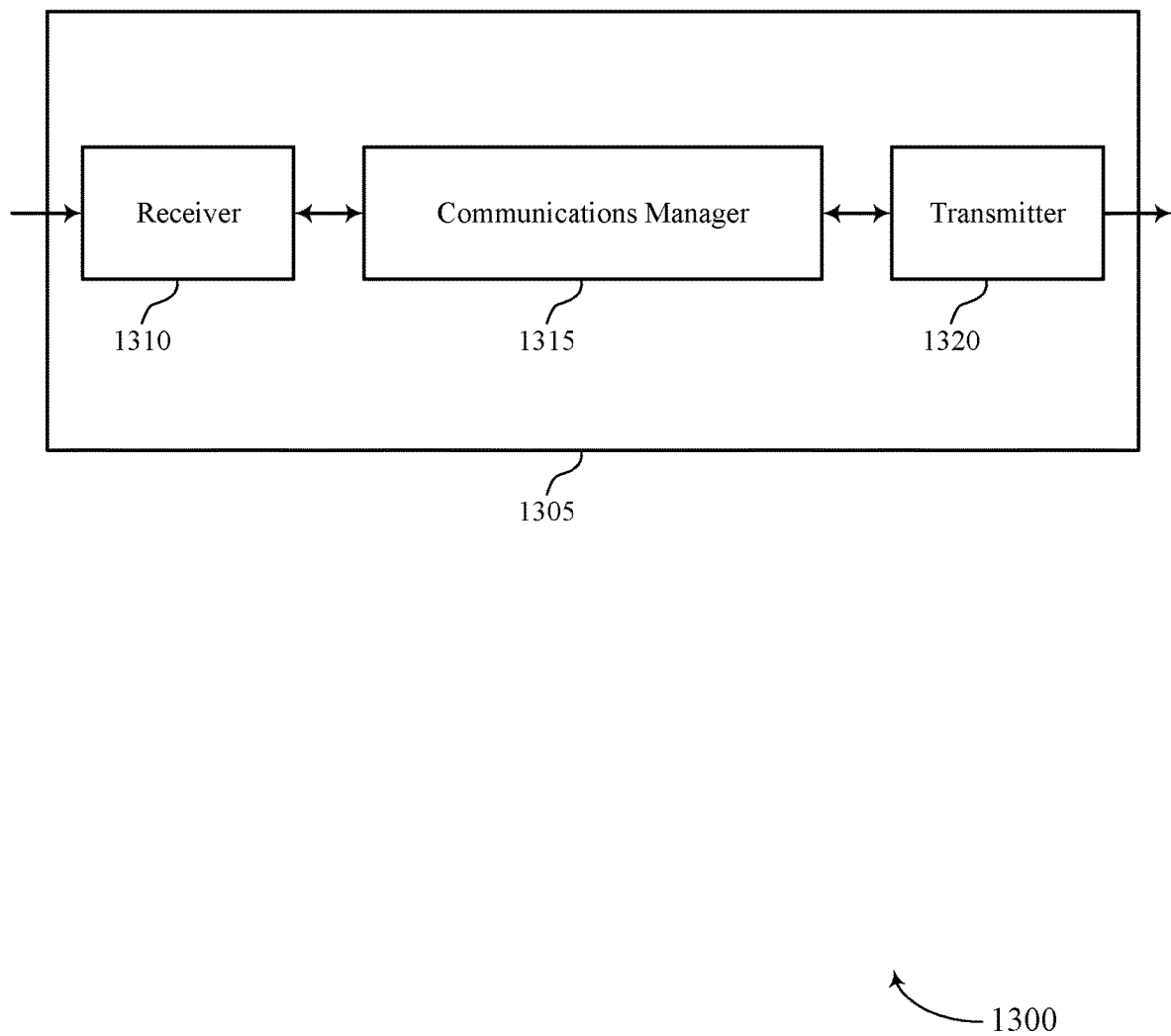
FIGS. 13 and 14 show block diagrams of devices that support control information combining techniques in wireless communications in accordance with aspects of the present disclosure.

FIG. 13 shows a block diagram 1300 of a device 1305 that supports control information combining techniques in wireless communications in accordance with aspects of the present disclosure. The device 1305 may be an example of aspects of a base station 105 as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to control information combining techniques in wireless communications, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may allocate two or more sets of downlink transmission resources for transmission of two or more instances of remaining minimum system information (RMSI) related information, transmit an indication to a UE 115 that combining of multiple instances of RMSI related information is supported, and transmit the two or more instances of the RMSI related information via the two or more sets of downlink transmission resources. The communications manager 1315 may be an example of aspects of the communications manager 1610 described herein.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
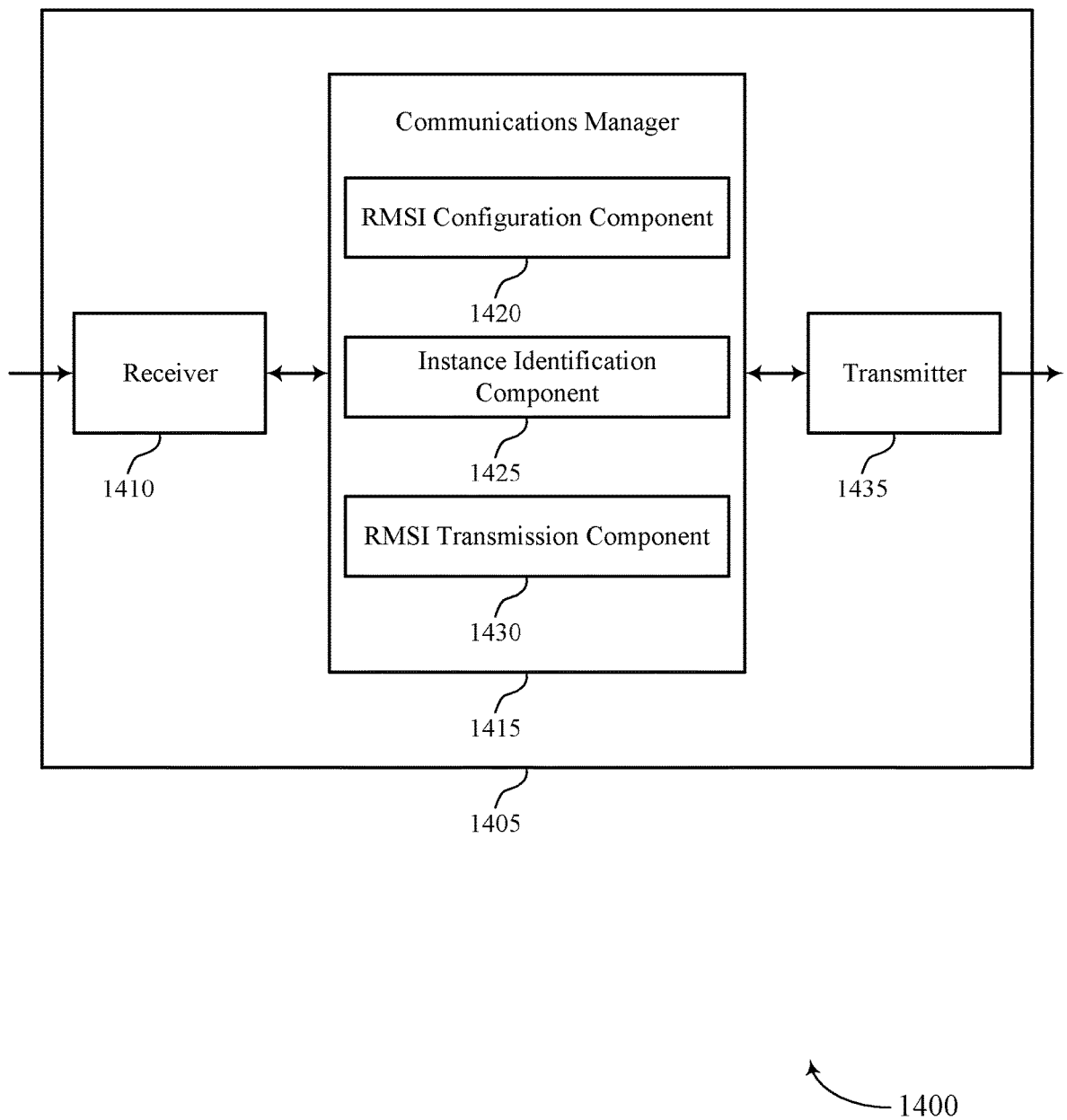

FIG. 14 shows a block diagram 1400 of a device 1405 that supports control information combining techniques in wireless communications in accordance with aspects of the present disclosure. The device 1405 may be an example of aspects of a device 1305 or a base station 105 as described herein. The device 1405 may include a receiver 1410, a communications manager 1415, and a transmitter 1435. The device 1405 may also include a processor. Each of these components may be in communication with one another (e.g., via one or more buses).

The receiver 1410 may receive information such as packets, user data, or control information associated with various information channels (e.g., control channels, data channels, and information related to control information combining techniques in wireless communications, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a RMSI configuration component 1420, an instance identification component 1425, and a RMSI transmission component 1430. The communications manager 1415 may be an example of aspects of the communications manager 1610 described herein.

The RMSI configuration component 1420 may allocate two or more sets of downlink transmission resources for transmission of two or more instances of remaining minimum system information (RMSI) related information.

The instance identification component 1425 may transmit an indication to a UE 115 that combining of multiple instances of RMSI related information is supported.

The RMSI transmission component 1430 may transmit the two or more instances of the RMSI related information via the two or more sets of downlink transmission resources.

The transmitter 1435 may transmit signals generated by other components of the device 1405. In some examples, the transmitter 1435 may be collocated with a receiver 1410 in a transceiver module. For example, the transmitter 1435 may be an example of aspects of the transceiver 1620 described with reference to FIG. 16. The transmitter 1435 may utilize a single antenna or a set of antennas.

Figure 15:
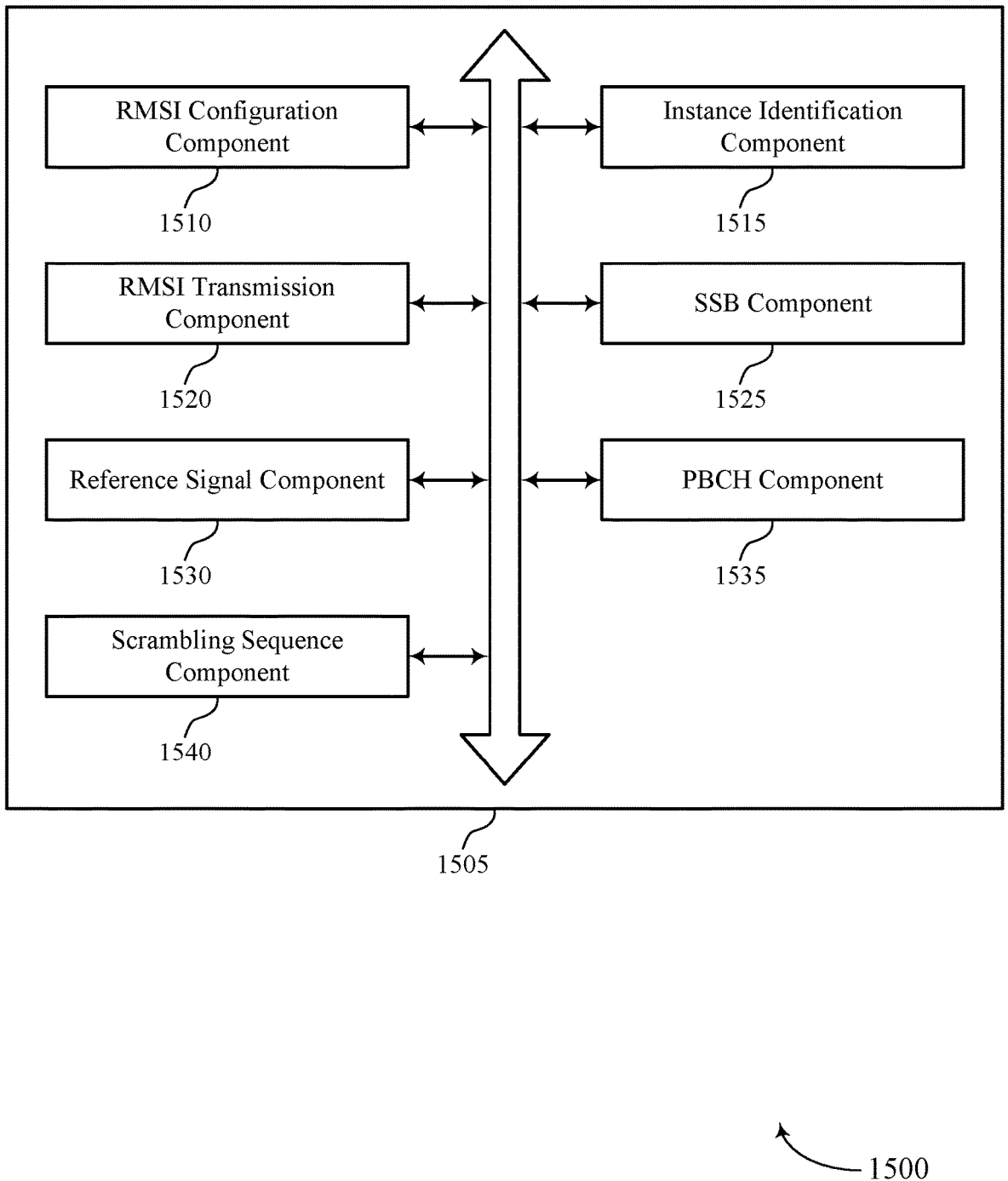
FIG. 15 shows a block diagram of a device that supports control information combining techniques in wireless communications in accordance with aspects of the present disclosure.

FIG. 15 shows a block diagram 1500 of a communications manager 1505 that supports control information combining techniques in wireless communications in accordance with aspects of the present disclosure. The communications manager 1505 may be an example of aspects of a communications manager 1315, a communications manager 1415, or a communications manager 1610 described herein. The communications manager 1505 may include a RMSI configuration component 1510, an instance identification component 1515, a RMSI transmission component 1520, a SSB component 1525, a reference signal component 1530, a PBCH component 1535, and a scrambling sequence component 1540. Each of these modules may communicate, directly or indirectly, with one another (e.g., via one or more buses).

The RMSI configuration component 1510 may allocate two or more sets of downlink transmission resources for transmission of two or more instances of remaining minimum system information (RMSI) related information. In some examples, the RMSI configuration component 1510 may identify an index value of a configuration table having one or more entries that include the indication. In some examples, the RMSI configuration component 1510 may transmit the index value. In some cases, the configuration table further indicates downlink transmission resources associated with the two or more instances of the RMSI related information.

The instance identification component 1515 may transmit an indication to a UE 115 that combining of multiple instances of RMSI related information is supported.

The RMSI transmission component 1520 may transmit the two or more instances of the RMSI related information via the two or more sets of downlink transmission resources.

The SSB component 1525 may transmit a first synchronization signal block (SSB) that includes the indication and an identification at least a second SSB that includes at least on instance of the RMSI related information. In some cases, the two or more sets of downlink transmission resources for transmission of the two or more instances of RMSI related information include two or more resources scheduled by a PBCH or a PDCCH associated with a given SSB ID, two or more resources scheduled by the PBCH or the PDCCH associated with different SSB IDs, or any combination thereof. In some cases, the identification of at least the second SSB includes a frequency offset of the second SSB relative to the first SSB.

The reference signal component 1530 may transmit the indication via at least one tone of one or more resource blocks (RBs) that are partially occupied by a synchronization signal. In some examples, the reference signal component 1530 may select a phase difference between a first reference signal and a second reference signal transmitted within a synchronization signal block (SSB), where a value of the phase difference provides the indication. In some cases, the at least one tone provides at least a one bit indicator via one or more RBs that are partially occupied by a PSS, a SSS, or combinations thereof. In some cases, the first reference signal is a PSS transmitted within the SSB, and the second reference signal is a SSS transmitted within the SSB.

The PBCH component 1535 may transmit the indication via an information field in a PBCH transmission within a SSB. In some examples, the PBCH component 1535 may set a flag in a PBCH transmission to signal a presence of the indication in a separate extended PBCH transmission. In some examples, the PBCH component 1535 may transmit the indication in the separate extended PBCH transmission. In some cases, the separate extended PBCH transmission is transmitted via predefined wireless resources associated with a synchronization signal block (SSB).

The scrambling sequence component 1540 may determine a scrambling sequence of a reference signal associated with a PBCH transmission within a SSB, where a value of the indication is identified based on which of a set of available scrambling sequences is used to scramble the reference signal.

Figure 16:
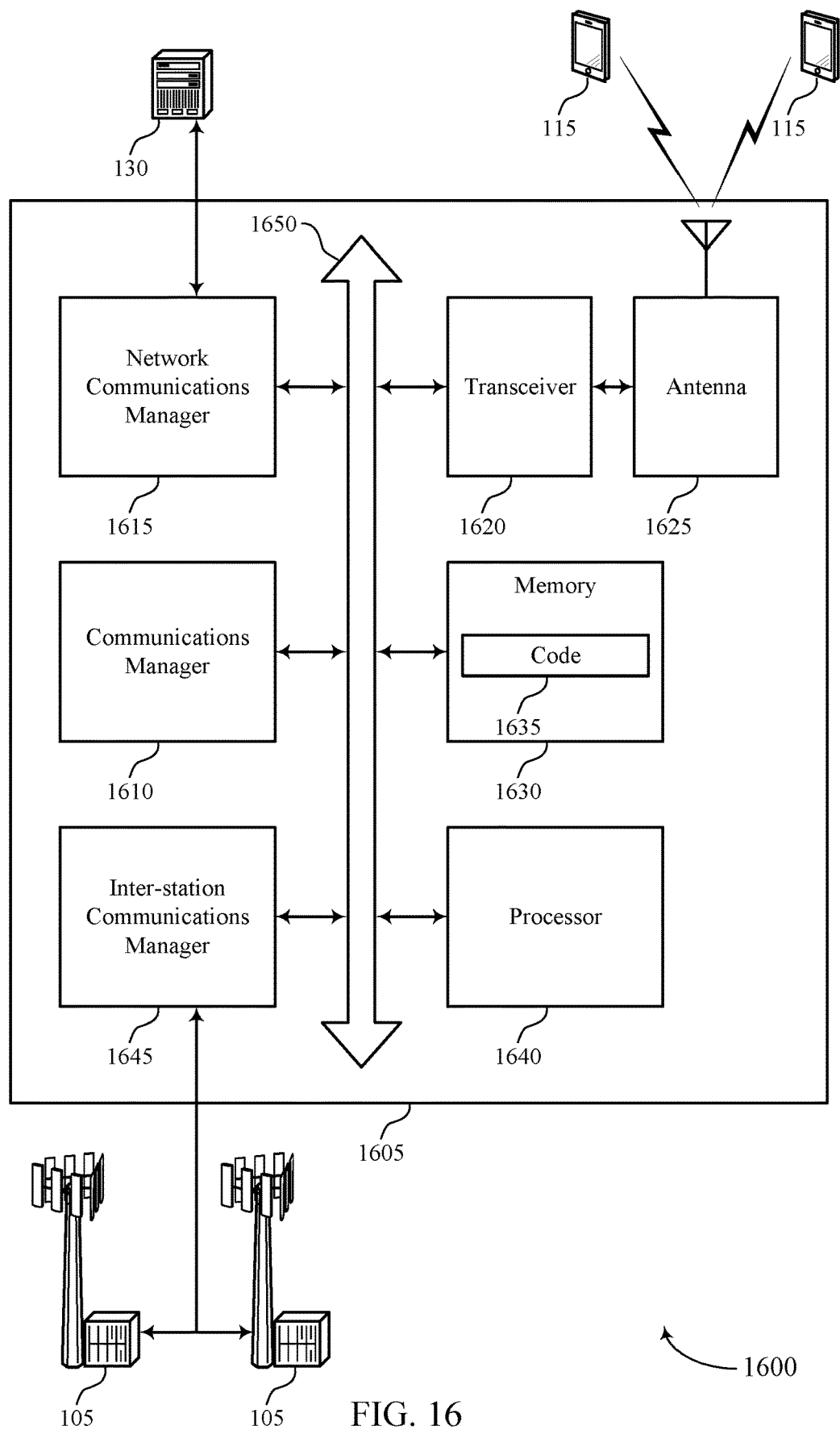
FIG. 16 shows a diagram of a system including a device that supports control information combining techniques in wireless communications in accordance with aspects of the present disclosure.

FIG. 16 shows a diagram of a system 1600 including a device 1605 that supports control information combining techniques in wireless communications in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The communications manager 1610 may allocate two or more sets of downlink transmission resources for transmission of two or more instances of remaining minimum system information (RMSI) control information, transmit an indication to a UE 115 that combining of multiple instances of RMSI control information is supported, and transmit the two or more instances of the RMSI control information via the two or more sets of downlink transmission resources.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device 1605 may include a single antenna 1625. However, in some cases the device 1605 may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device 1605 to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting control information combining techniques in wireless communications).

The inter-station communications manager 1645 may manage communications with other base stations 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
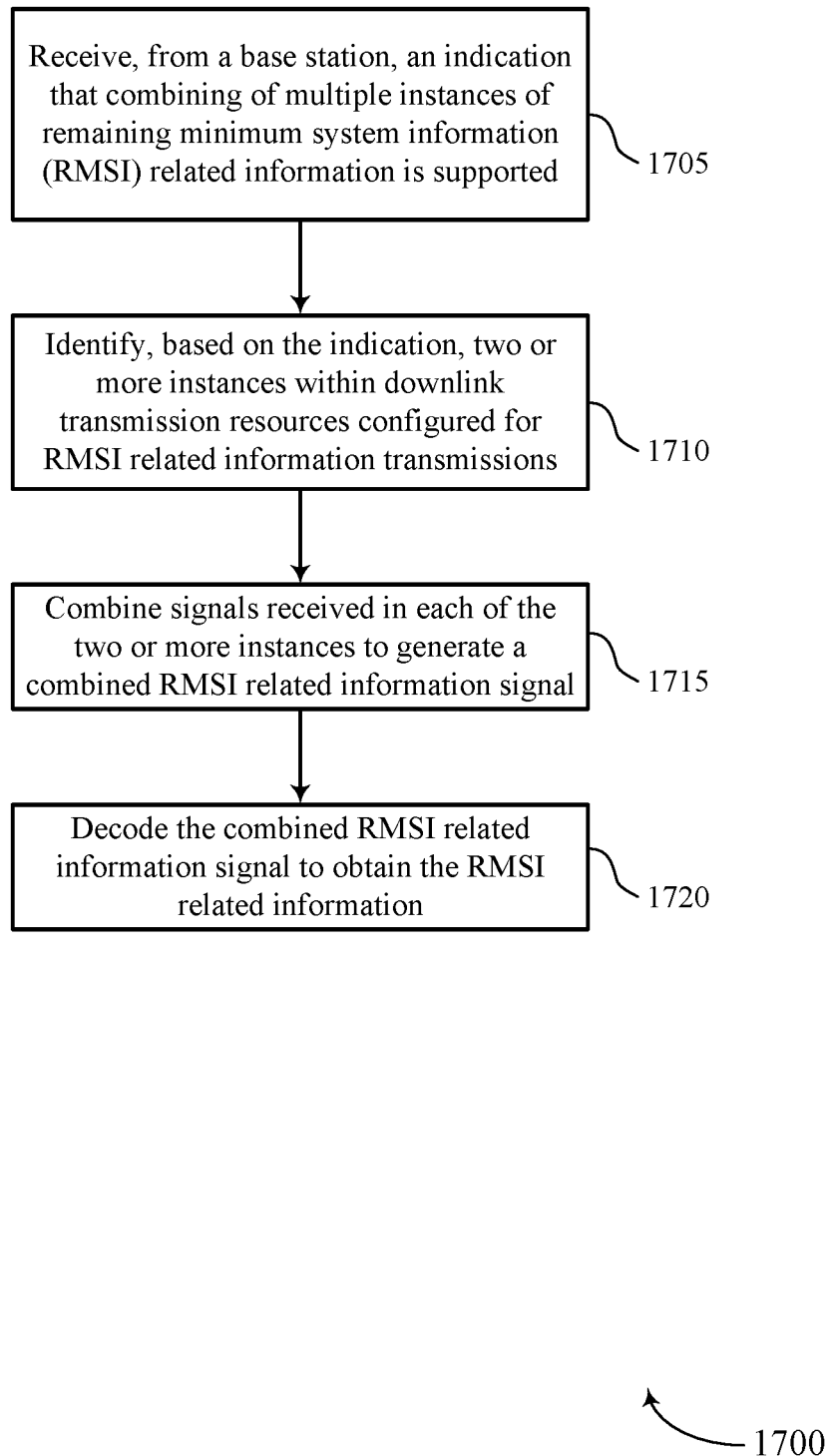
FIGS. 17 through 30 show flowcharts illustrating methods that support control information combining techniques in wireless communications in accordance with aspects of the present disclosure.

FIG. 17 shows a flowchart illustrating a method 1700 that supports control information combining techniques in wireless communications in accordance with aspects of the present disclosure. The operations of method 1700 may be implemented by a UE 115 or its components as described herein. For example, the operations of method 1700 may be performed by a communications manager as described with reference to FIGS. 9 to 12. In some examples, a UE 115 may execute a set of instructions to control the functional elements of the UE 115 to perform the functions described below. Additionally or alternatively, a UE 115 may perform aspects of the functions described below using special-purpose hardware.

At 1705, the UE 115 may receive, from a base station 105, an indication that combining of multiple instances of RMSI related information is supported. The operations of 1705 may be performed according to the methods described herein. In some examples, aspects of the operations of 1705 may be performed by a RMSI configuration component as described with reference to FIGS. 9 to 12.

At 1710, the UE 115 may identify, based on the indication, two or more instances within downlink transmission resources configured for RMSI related information transmissions. The operations of 1710 may be performed according to the methods described herein. In some examples, aspects of the operations of 1710 may be performed by an instance identification component as described with reference to FIGS. 9 to 12. In some cases, the two or more instances within downlink transmission resources configured for RMSI related information transmissions include two or more resources scheduled by a PBCH or a PDCCH associated with a given SSB ID, two or more resources scheduled by the PBCH or the PDCCH associated with different SSB IDs, or any combination thereof.

At 1715, the UE 115 may combine signals received in each of the two or more instances to generate a combined RMSI related information signal. The operations of 1715 may be performed according to the methods described herein. In some examples, aspects of the operations of 1715 may be performed by a combining component as described with reference to FIGS. 9 to 12.

At 1720, the UE 115 may decode the combined RMSI related information signal to obtain the RMSI related information. The operations of 1720 may be performed according to the methods described herein. In some examples, aspects of the operations of 1720 may be performed by a decoder as described with reference to FIGS. 9 to 12.

Figure 18:
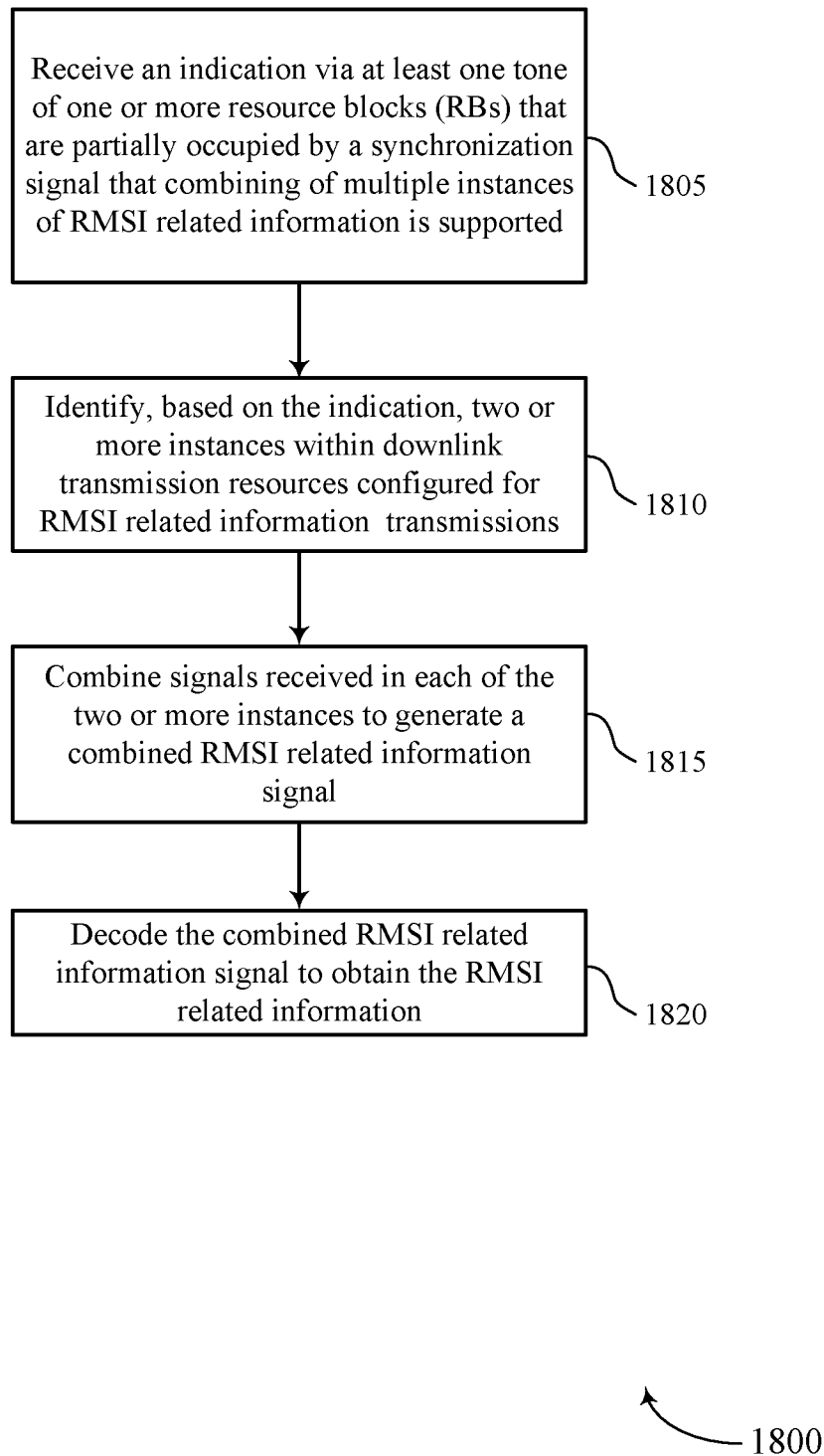

FIG. 18 shows a flowchart illustrating a method 1800 that supports control information combining techniques in wireless communications in accordance with aspects of the present disclosure. The operations of method 1800 may be implemented by a UE 115 or its components as described herein. For example, the operations of method 1800 may be performed by a communications manager as described with reference to FIGS. 9 to 12. In some examples, a UE 115 may execute a set of instructions to control the functional elements of the UE 115 to perform the functions described below. Additionally or alternatively, a UE 115 may perform aspects of the functions described below using special-purpose hardware.

At 1805, the UE 115 may receive an indication via at least one tone of one or more resource blocks (RBs) that are partially occupied by a synchronization signal that combining of multiple instances of RMSI related information is supported. The operations of 1805 may be performed according to the methods described herein. In some examples, aspects of the operations of 1805 may be performed by a RMSI configuration component as described with reference to FIGS. 9 to 12. In some cases, the at least one tone provides at least a one bit indicator via one or more RBs that are partially occupied by a PSS, a SSS, or combinations thereof.

At 1810, the UE 115 may identify, based on the indication, two or more instances within downlink transmission resources configured for RMSI related information transmissions. The operations of 1810 may be performed according to the methods described herein. In some examples, aspects of the operations of 1810 may be performed by an instance identification component as described with reference to FIGS. 9 to 12.

At 1815, the UE 115 may combine signals received in each of the two or more instances to generate a combined RMSI related information signal. The operations of 1815 may be performed according to the methods described herein. In some examples, aspects of the operations of 1815 may be performed by a combining component as described with reference to FIGS. 9 to 12.

At 1820, the UE 115 may decode the combined RMSI related information signal to obtain the RMSI related information. The operations of 1820 may be performed according to the methods described herein. In some examples, aspects of the operations of 1820 may be performed by a decoder as described with reference to FIGS. 9 to 12.

Figure 19:
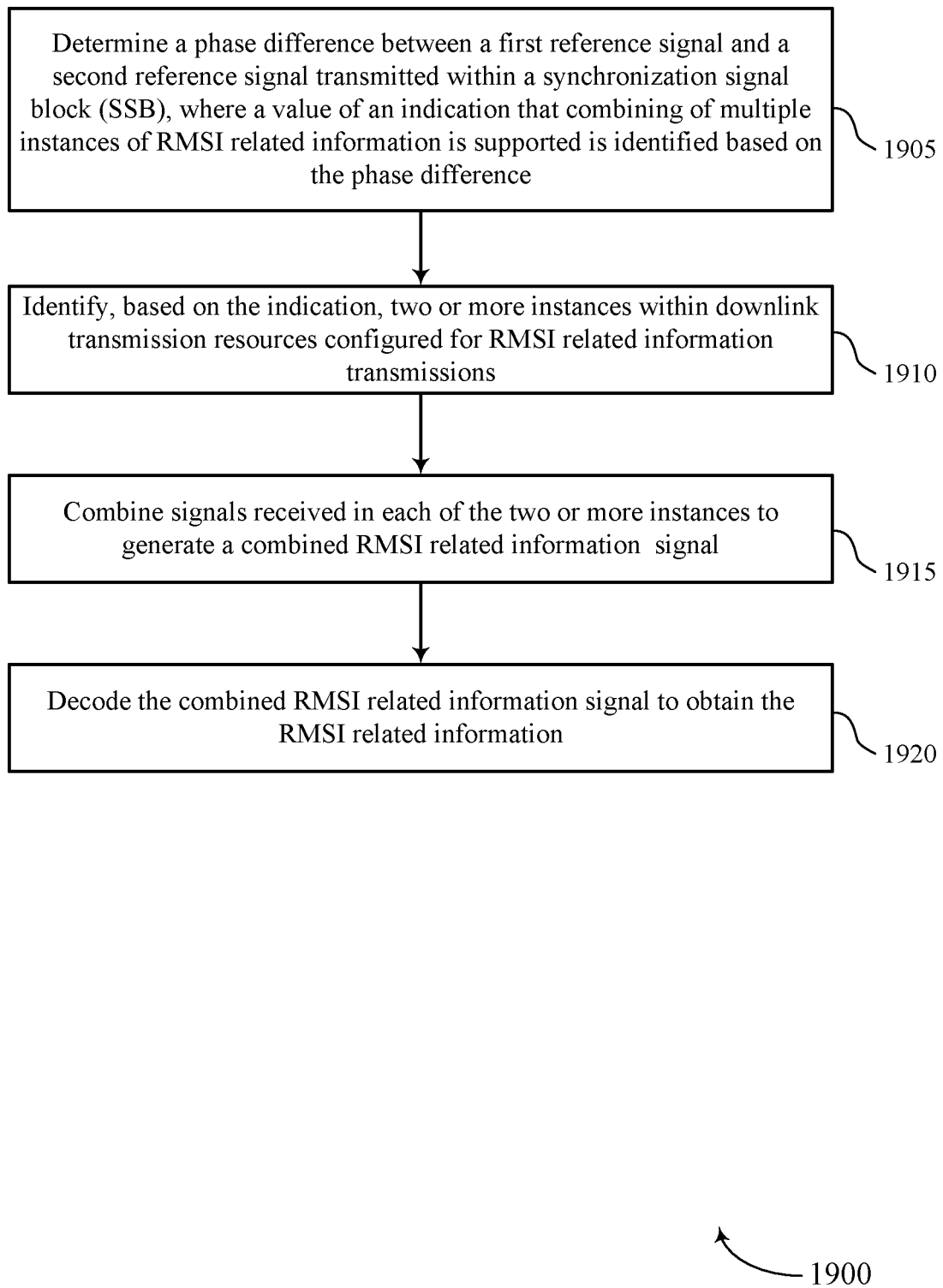

FIG. 19 shows a flowchart illustrating a method 1900 that supports control information combining techniques in wireless communications in accordance with aspects of the present disclosure. The operations of method 1900 may be implemented by a UE 115 or its components as described herein. For example, the operations of method 1900 may be performed by a communications manager as described with reference to FIGS. 9 to 12. In some examples, a UE 115 may execute a set of instructions to control the functional elements of the UE to perform the functions described below. Additionally or alternatively, a UE 115 may perform aspects of the functions described below using special-purpose hardware.

At 1905, the UE 115 may determine a phase difference between a first reference signal and a second reference signal transmitted within a SSB, where a value of an indication that combining of multiple instances of RMSI related information is supported is identified based on the phase difference. The operations of 1905 may be performed according to the methods described herein. In some examples, aspects of the operations of 1905 may be performed by a RMSI configuration component as described with reference to FIGS. 9 to 12. In some cases, the first reference signal is a PSS transmitted within the SSB, and the second reference signal is a SSS transmitted within the SSB.

At 1910, the UE 115 may identify, based on the indication, two or more instances within downlink transmission resources configured for RMSI related information transmissions. The operations of 1910 may be performed according to the methods described herein. In some examples, aspects of the operations of 1910 may be performed by an instance identification component as described with reference to FIGS. 9 to 12.

At 1915, the UE 115 may combine signals received in each of the two or more instances to generate a combined RMSI related information signal. The operations of 1915 may be performed according to the methods described herein. In some examples, aspects of the operations of 1915 may be performed by a combining component as described with reference to FIGS. 9 to 12.

At 1920, the UE 115 may decode the combined RMSI related information signal to obtain the RMSI related information. The operations of 1920 may be performed according to the methods described herein. In some examples, aspects of the operations of 1920 may be performed by a decoder as described with reference to FIGS. 9 to 12.

Figure 20:
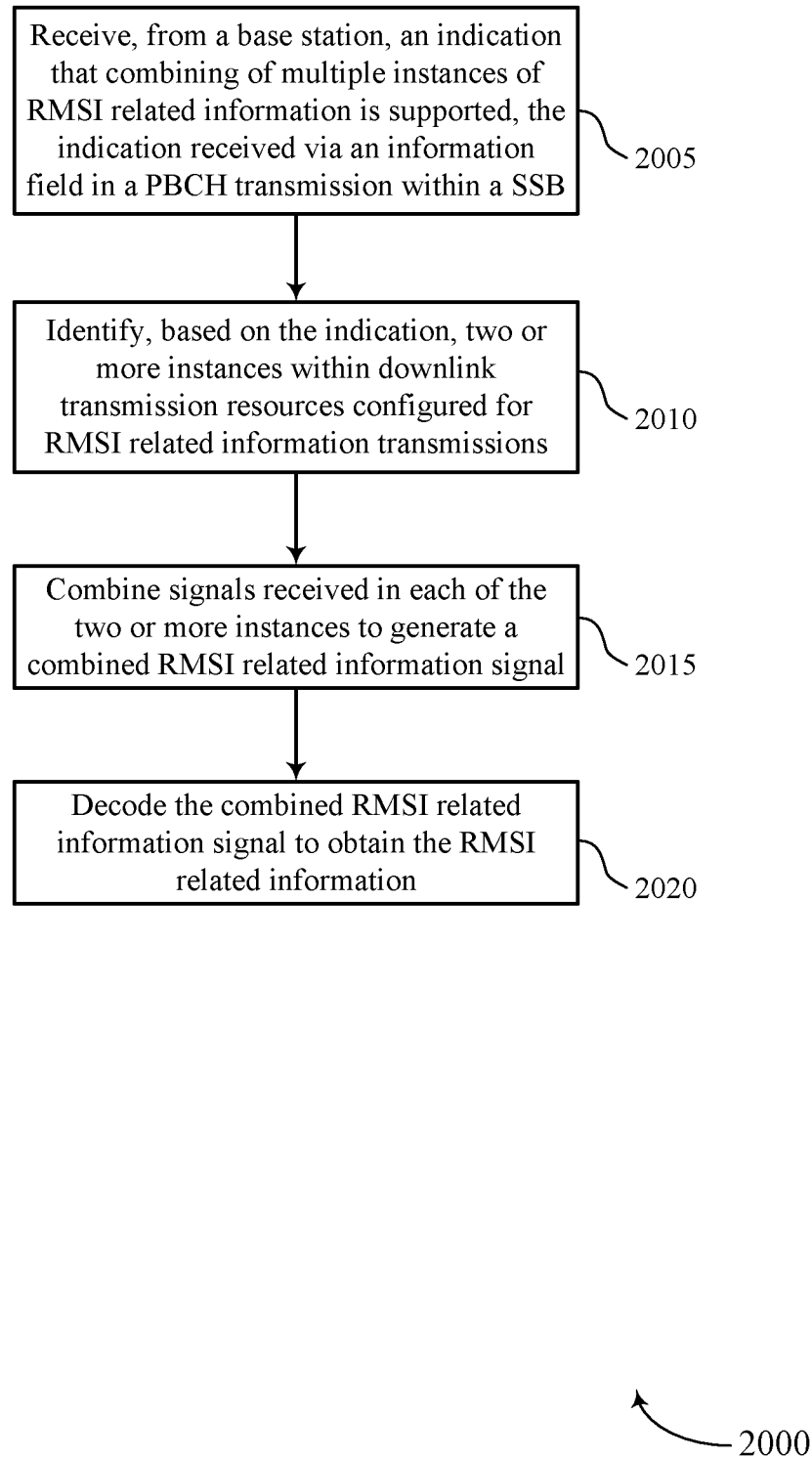

FIG. 20 shows a flowchart illustrating a method 2000 that supports control information combining techniques in wireless communications in accordance with aspects of the present disclosure. The operations of method 2000 may be implemented by a UE 115 or its components as described herein. For example, the operations of method 2000 may be performed by a communications manager as described with reference to FIGS. 9 to 12. In some examples, a UE 115 may execute a set of instructions to control the functional elements of the UE 115 to perform the functions described below. Additionally or alternatively, a UE 115 may perform aspects of the functions described below using special-purpose hardware.

At 2005, the UE 115 may receive, from a base station 105, an indication that combining of multiple instances of RMSI related information is supported, the indication received via an information field in a PBCH transmission within a SSB. The operations of 2005 may be performed according to the methods described herein. In some examples, aspects of the operations of 2005 may be performed by a RMSI configuration component as described with reference to FIGS. 9 to 12.

At 2010, the UE 115 may identify, based on the indication, two or more instances within downlink transmission resources configured for RMSI related information transmissions. The operations of 2010 may be performed according to the methods described herein. In some examples, aspects of the operations of 2010 may be performed by an instance identification component as described with reference to FIGS. 9 to 12.

At 2015, the UE 115 may combine signals received in each of the two or more instances to generate a combined RMSI related information signal. The operations of 2015 may be performed according to the methods described herein. In some examples, aspects of the operations of 2015 may be performed by a combining component as described with reference to FIGS. 9 to 12.

At 2020, the UE 115 may decode the combined RMSI related information signal to obtain the RMSI related information. The operations of 2020 may be performed according to the methods described herein. In some examples, aspects of the operations of 2020 may be performed by a decoder as described with reference to FIGS. 9 to 12.

Figure 21:
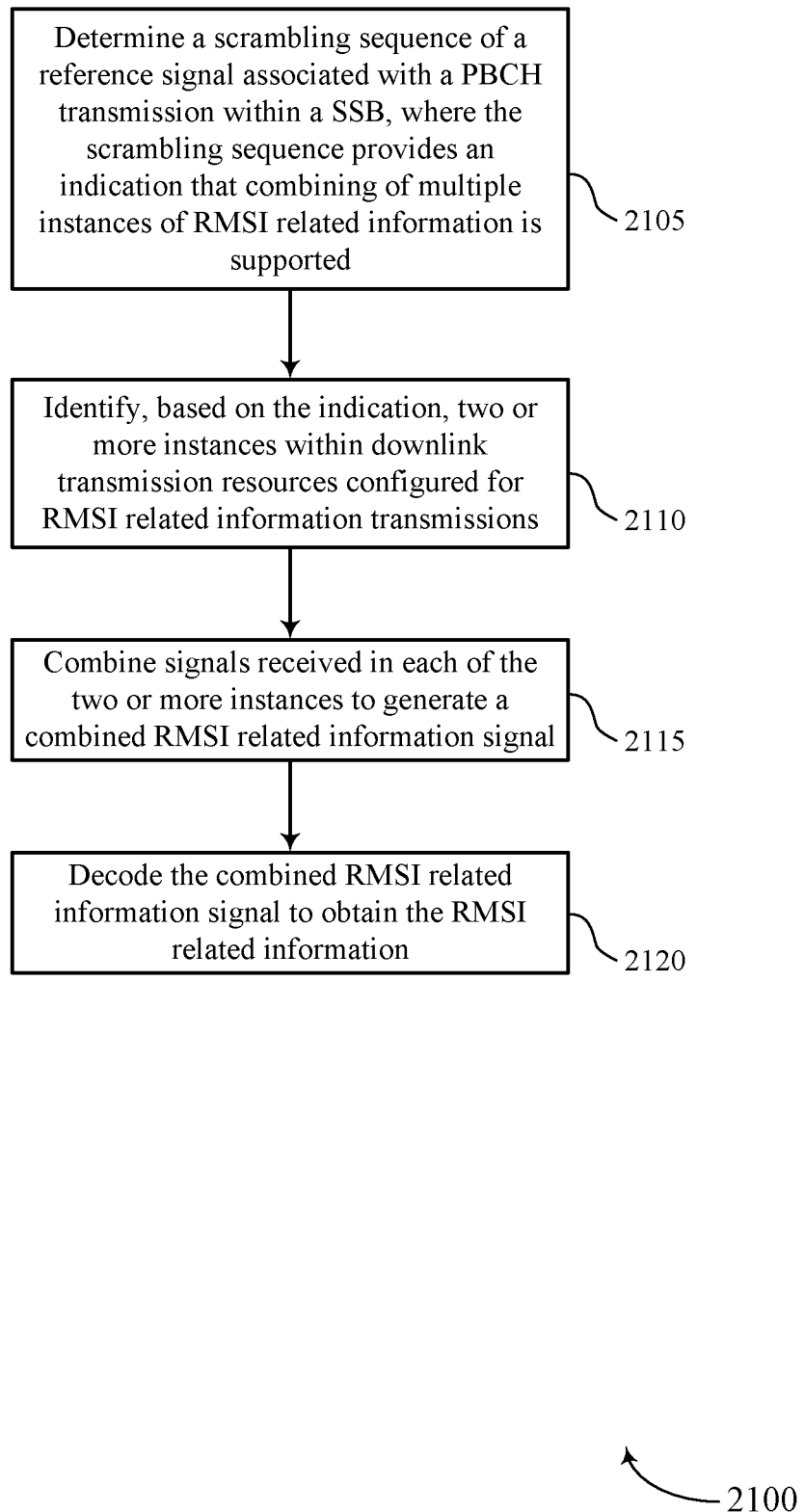

FIG. 21 shows a flowchart illustrating a method 2100 that supports control information combining techniques in wireless communications in accordance with aspects of the present disclosure. The operations of method 2100 may be implemented by a UE 115 or its components as described herein. For example, the operations of method 2100 may be performed by a communications manager as described with reference to FIGS. 9 to 12. In some examples, a UE 115 may execute a set of instructions to control the functional elements of the UE 115 to perform the functions described below. Additionally or alternatively, a UE 115 may perform aspects of the functions described below using special-purpose hardware.

At 2105, the UE 115 may determine a scrambling sequence of a reference signal associated with a PBCH transmission within a SSB, where the scrambling sequence provides an indication that combining of multiple instances of RMSI related information is supported. The operations of 2105 may be performed according to the methods described herein. In some examples, aspects of the operations of 2105 may be performed by a scrambling sequence component as described with reference to FIGS. 9 to 12.

At 2110, the UE 115 may identify, based on the indication, two or more instances within downlink transmission resources configured for RMSI related information transmissions. The operations of 2110 may be performed according to the methods described herein. In some examples, aspects of the operations of 2110 may be performed by an instance identification component as described with reference to FIGS. 9 to 12.

At 2115, the UE 115 may combine signals received in each of the two or more instances to generate a combined RMSI related information signal. The operations of 2115 may be performed according to the methods described herein. In some examples, aspects of the operations of 2115 may be performed by a combining component as described with reference to FIGS. 9 to 12.

At 2120, the UE 115 may decode the combined RMSI related information signal to obtain the RMSI related information. The operations of 2120 may be performed according to the methods described herein. In some examples, aspects of the operations of 2120 may be performed by a decoder as described with reference to FIGS. 9 to 12.

Figure 22:
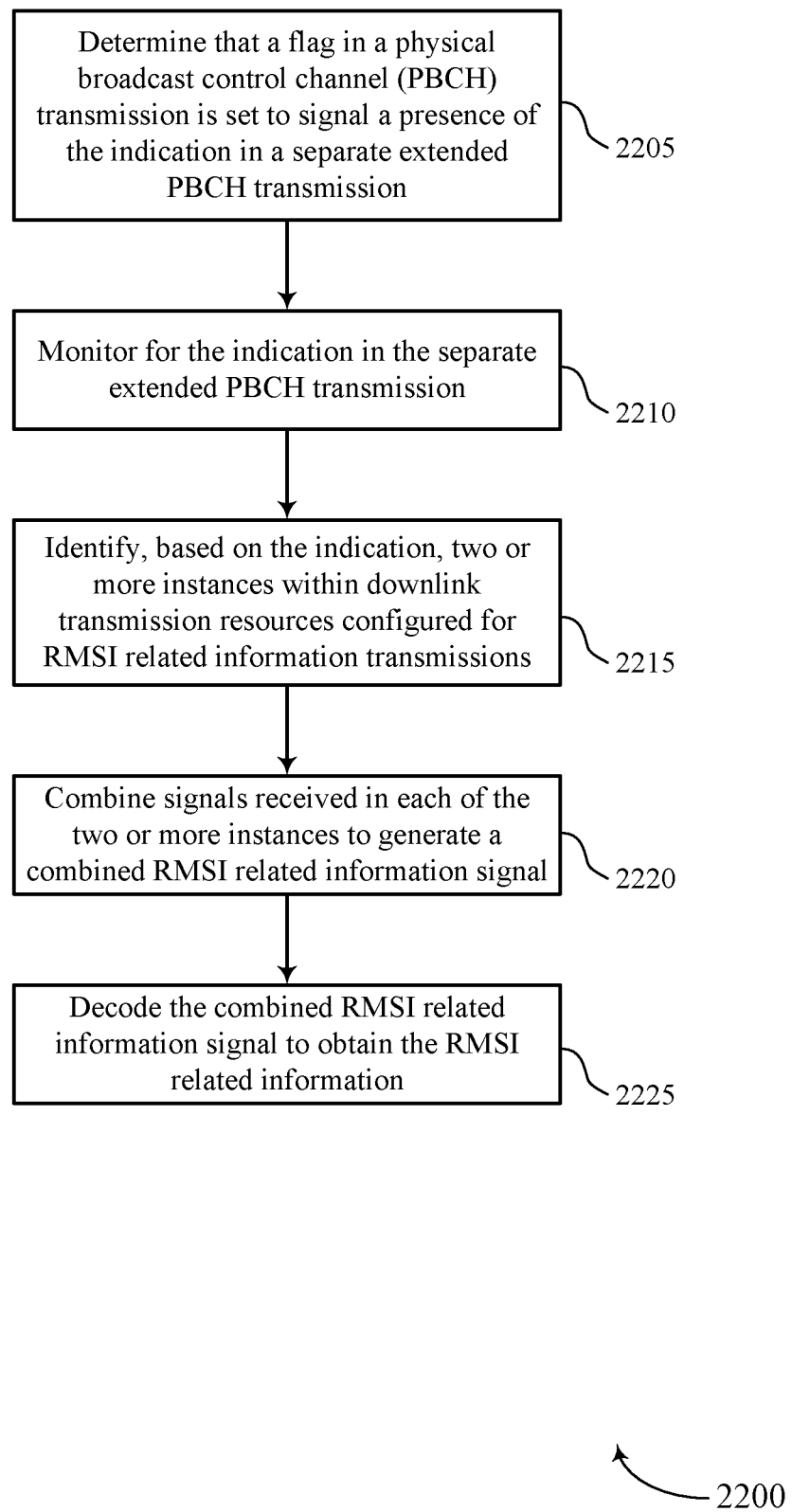

FIG. 22 shows a flowchart illustrating a method 2200 that supports control information combining techniques in wireless communications in accordance with aspects of the present disclosure. The operations of method 2200 may be implemented by a UE 115 or its components as described herein. For example, the operations of method 2200 may be performed by a communications manager as described with reference to FIGS. 9 to 12. In some examples, a UE 115 may execute a set of instructions to control the functional elements of the UE 115 to perform the functions described below. Additionally or alternatively, a UE 115 may perform aspects of the functions described below using special-purpose hardware.

At 2205, the UE 115 may determine that a flag in a physical broadcast control channel (PBCH) transmission is set to signal a presence of the indication in a separate extended PBCH transmission. The operations of 2205 may be performed according to the methods described herein. In some examples, aspects of the operations of 2205 may be performed by a PBCH component as described with reference to FIGS. 9 to 12.

At 2210, the UE 115 may monitor for the indication in the separate extended PBCH transmission. The operations of 2210 may be performed according to the methods described herein. In some examples, aspects of the operations of 2210 may be performed by a PBCH component as described with reference to FIGS. 9 to 12.

At 2215, the UE 115 may identify, based on the indication, two or more instances within downlink transmission resources configured for RMSI related information transmissions. The operations of 2215 may be performed according to the methods described herein. In some examples, aspects of the operations of 2215 may be performed by an instance identification component as described with reference to FIGS. 9 to 12.

At 2220, the UE 115 may combine signals received in each of the two or more instances to generate a combined RMSI related information signal. The operations of 2220 may be performed according to the methods described herein. In some examples, aspects of the operations of 2220 may be performed by a combining component as described with reference to FIGS. 9 to 12.

At 2225, the UE 115 may decode the combined RMSI related information signal to obtain the RMSI related information. The operations of 2225 may be performed according to the methods described herein. In some examples, aspects of the operations of 2225 may be performed by a decoder as described with reference to FIGS. 9 to 12.

Figure 23:
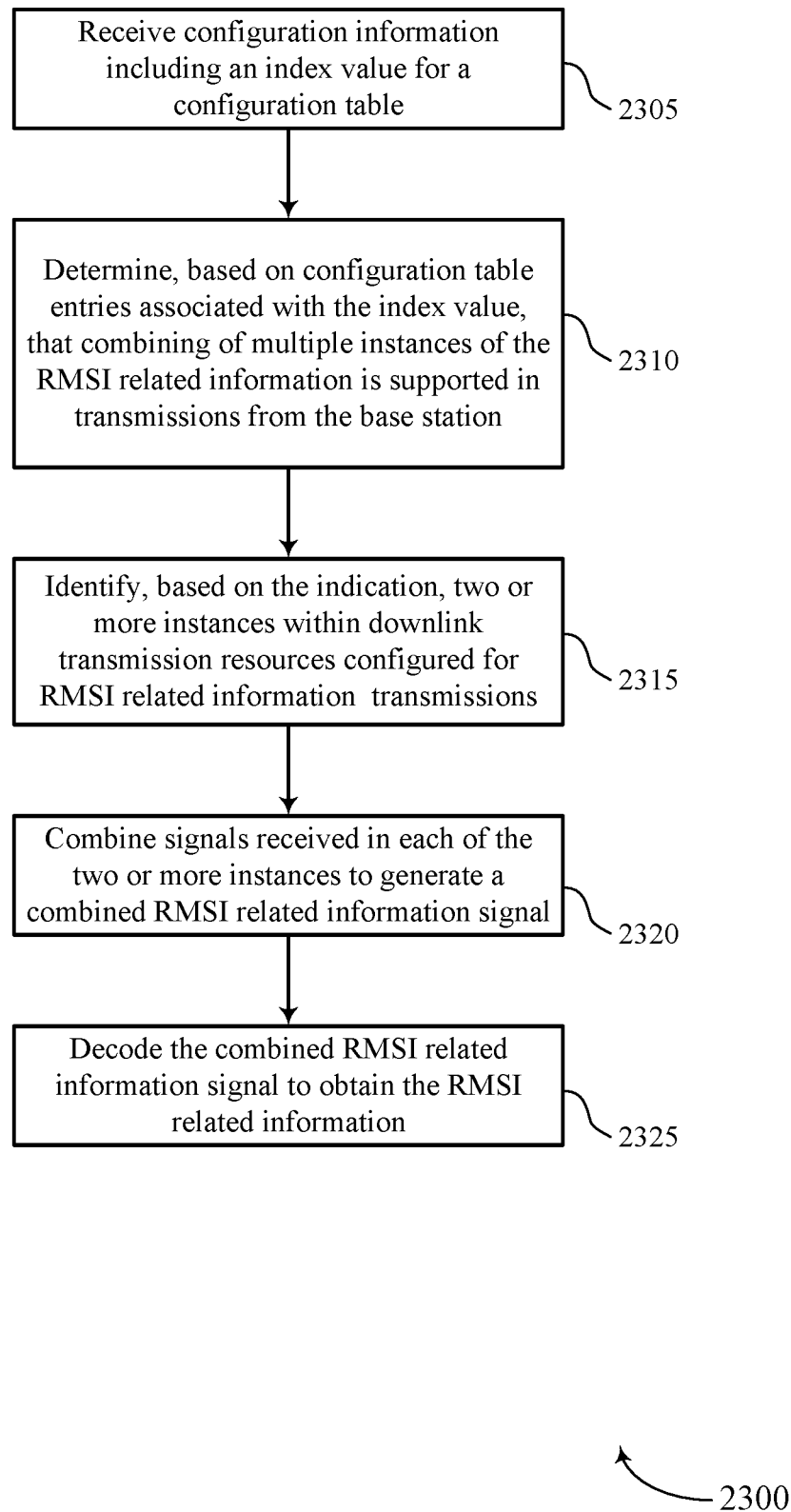

FIG. 23 shows a flowchart illustrating a method 2300 that supports control information combining techniques in wireless communications in accordance with aspects of the present disclosure. The operations of method 2300 may be implemented by a UE 115 or its components as described herein. For example, the operations of method 2300 may be performed by a communications manager as described with reference to FIGS. 9 to 12. In some examples, a UE 115 may execute a set of instructions to control the functional elements of the UE 115 to perform the functions described below. Additionally or alternatively, a UE 115 may perform aspects of the functions described below using special-purpose hardware.

At 2305, the UE 115 may receive configuration information including an index value for a configuration table. The operations of 2305 may be performed according to the methods described herein. In some examples, aspects of the operations of 2305 may be performed by a RMSI configuration component as described with reference to FIGS. 9 to 12.

At 2310, the UE 115 may determine, based on configuration table entries associated with the index value, that combining of multiple instances of the RMSI related information is supported in transmissions from the base station. The operations of 2310 may be performed according to the methods described herein. In some examples, aspects of the operations of 2310 may be performed by a undefined as described with reference to FIGS. 9 to 12.

At 2315, the UE 115 may identify, based on the indication, two or more instances within downlink transmission resources configured for RMSI related information transmissions. The operations of 2315 may be performed according to the methods described herein. In some examples, aspects of the operations of 2315 may be performed by an instance identification component as described with reference to FIGS. 9 to 12.

At 2320, the UE 115 may combine signals received in each of the two or more instances to generate a combined RMSI related information signal. The operations of 2320 may be performed according to the methods described herein. In some examples, aspects of the operations of 2320 may be performed by a combining component as described with reference to FIGS. 9 to 12.

At 2325, the UE 115 may decode the combined RMSI related information signal to obtain the RMSI related information. The operations of 2325 may be performed according to the methods described herein. In some examples, aspects of the operations of 2325 may be performed by a decoder as described with reference to FIGS. 9 to 12.

Figure 24:
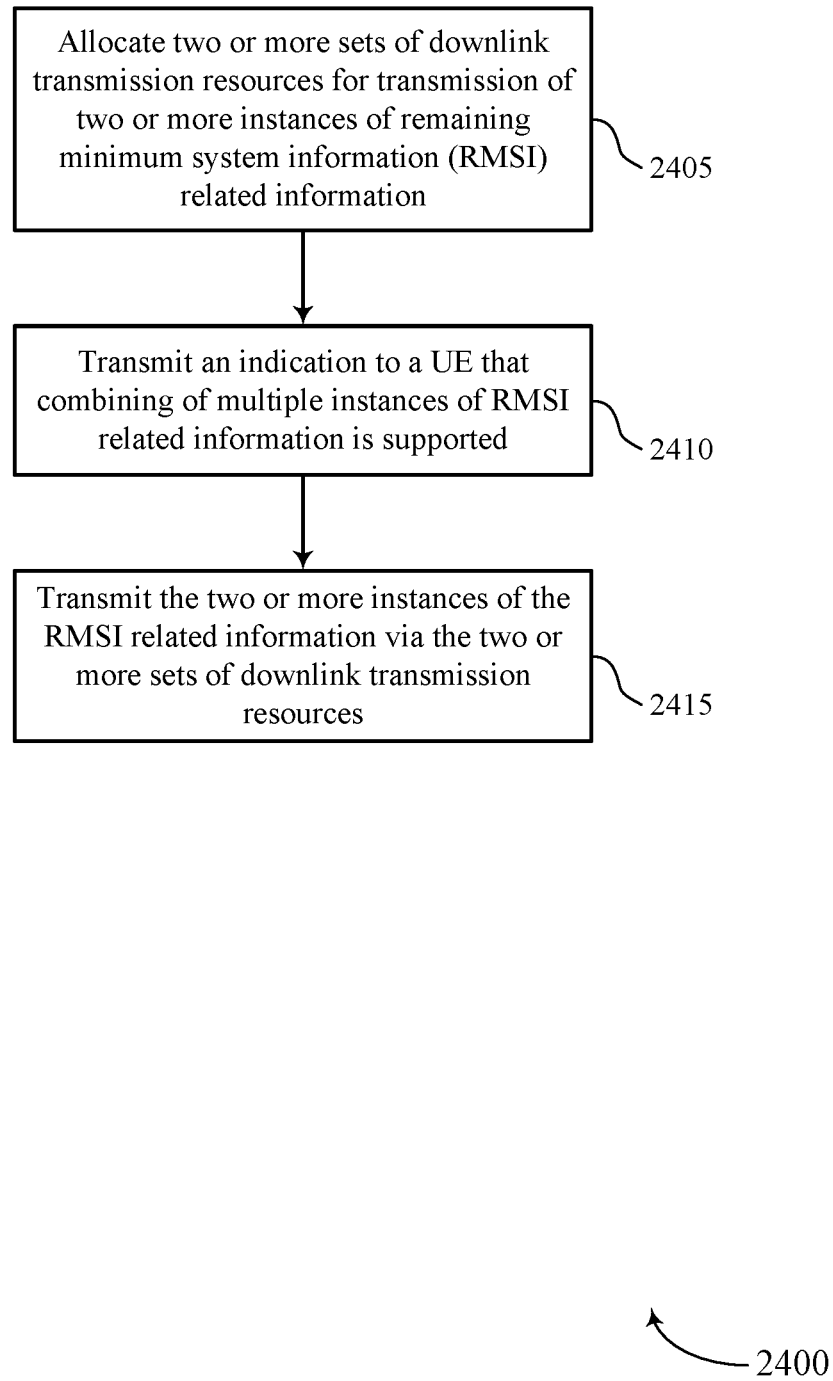

FIG. 24 shows a flowchart illustrating a method 2400 that supports control information combining techniques in wireless communications in accordance with aspects of the present disclosure. The operations of method 2400 may be implemented by a base station 105 or its components as described herein. For example, the operations of method 2400 may be performed by a communications manager as described with reference to FIGS. 13 to 16. In some examples, a base station 105 may execute a set of instructions to control the functional elements of the base station 105 to perform the functions described below. Additionally or alternatively, a base station 105 may perform aspects of the functions described below using special-purpose hardware.

At 2405, the base station 105 may allocate two or more sets of downlink transmission resources for transmission of two or more instances of remaining minimum system information (RMSI) related information. The operations of 2405 may be performed according to the methods described herein. In some examples, aspects of the operations of 2405 may be performed by a RMSI configuration component as described with reference to FIGS. 13 to 16.

At 2410, the base station 105 may transmit an indication to a UE 115 that combining of multiple instances of RMSI related information is supported. The operations of 2410 may be performed according to the methods described herein. In some examples, aspects of the operations of 2410 may be performed by an instance identification component as described with reference to FIGS. 13 to 16.

At 2415, the base station 105 may transmit the two or more instances of the RMSI related information via the two or more sets of downlink transmission resources. The operations of 2415 may be performed according to the methods described herein. In some examples, aspects of the operations of 2415 may be performed by a RMSI transmission component as described with reference to FIGS. 13 to 16.

Figure 25:
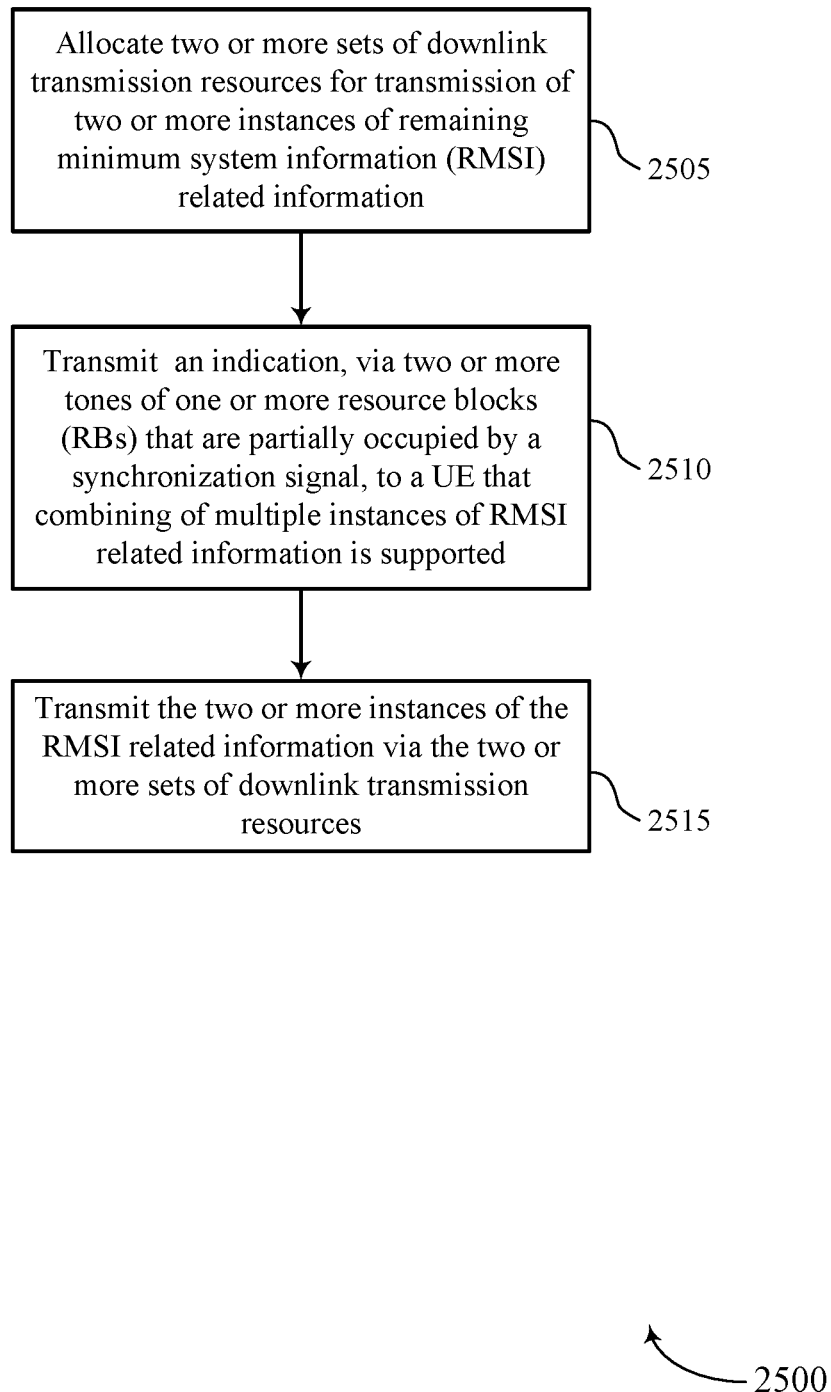

FIG. 25 shows a flowchart illustrating a method 2500 that supports control information combining techniques in wireless communications in accordance with aspects of the present disclosure. The operations of method 2500 may be implemented by a base station 105 or its components as described herein. For example, the operations of method 2500 may be performed by a communications manager as described with reference to FIGS. 13 to 16. In some examples, a base station 105 may execute a set of instructions to control the functional elements of the base station 105 to perform the functions described below. Additionally or alternatively, a base station 105 may perform aspects of the functions described below using special-purpose hardware.

At 2505, the base station 105 may allocate two or more sets of downlink transmission resources for transmission of two or more instances of remaining minimum system information (RMSI) related information. The operations of 2505 may be performed according to the methods described herein. In some examples, aspects of the operations of 2505 may be performed by a RMSI configuration component as described with reference to FIGS. 13 to 16.

At 2510, the base station 105 may transmit an indication, via at least one tone of one or more resource blocks (RBs) that are partially occupied by a synchronization signal, to a UE 115 that combining of multiple instances of RMSI related information is supported. The operations of 2510 may be performed according to the methods described herein. In some examples, aspects of the operations of 2510 may be performed by a reference signal component as described with reference to FIGS. 13 to 16.

At 2515, the base station 105 may transmit the two or more instances of the RMSI related information via the two or more sets of downlink transmission resources. The operations of 2515 may be performed according to the methods described herein. In some examples, aspects of the operations of 2515 may be performed by a RMSI transmission component as described with reference to FIGS. 13 to 16.

Figure 26:
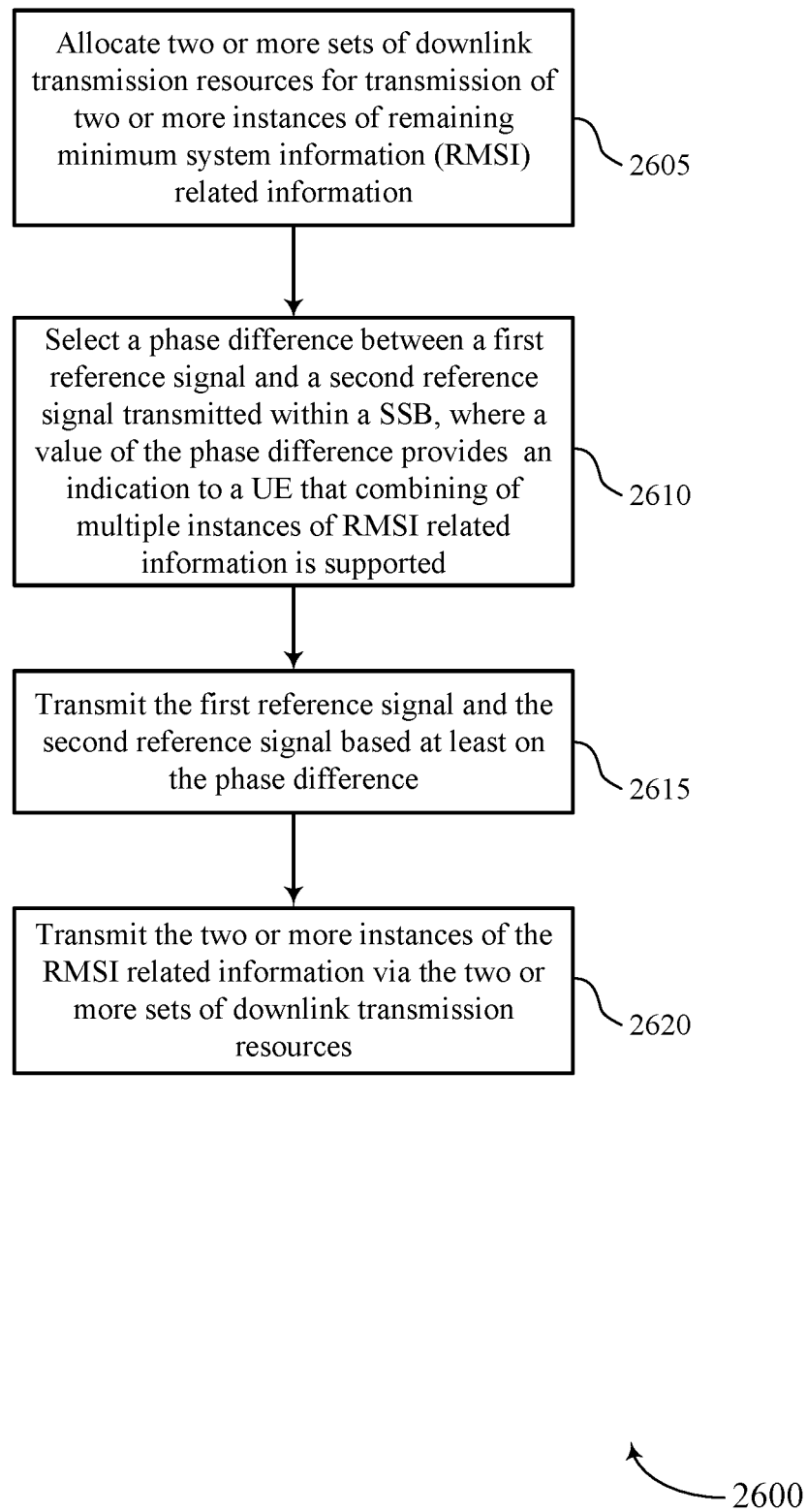

FIG. 26 shows a flowchart illustrating a method 2600 that supports control information combining techniques in wireless communications in accordance with aspects of the present disclosure. The operations of method 2600 may be implemented by a base station 105 or its components as described herein. For example, the operations of method 2600 may be performed by a communications manager as described with reference to FIGS. 13 to 16. In some examples, a base station 105 may execute a set of instructions to control the functional elements of the base station 105 to perform the functions described below. Additionally or alternatively, a base station 105 may perform aspects of the functions described below using special-purpose hardware.

At 2605, the base station 105 may allocate two or more sets of downlink transmission resources for transmission of two or more instances of remaining minimum system information (RMSI) related information. The operations of 2605 may be performed according to the methods described herein. In some examples, aspects of the operations of 2605 may be performed by a RMSI configuration component as described with reference to FIGS. 13 to 16.

At 2610, the base station 105 may select a phase difference between a first reference signal and a second reference signal transmitted within a synchronization signal block (SSB), where a value of the phase difference provides an indication to a UE 115 that combining of multiple instances of RMSI related information is supported. The operations of 2610 may be performed according to the methods described herein. In some examples, aspects of the operations of 2610 may be performed by a reference signal component as described with reference to FIGS. 13 to 16.

At 2615, the base station 105 may transmit the first reference signal and the second reference signal based at least on the phase difference. The operations of 2615 may be performed according to the methods described herein. In some examples, aspects of the operations of 2615 may be performed by a undefined as described with reference to FIGS. 13 to 16.

At 2620, the base station 105 may transmit the two or more instances of the RMSI related information via the two or more sets of downlink transmission resources. The operations of 2620 may be performed according to the methods described herein. In some examples, aspects of the operations of 2620 may be performed by a RMSI transmission component as described with reference to FIGS. 13 to 16.

Figure 27:
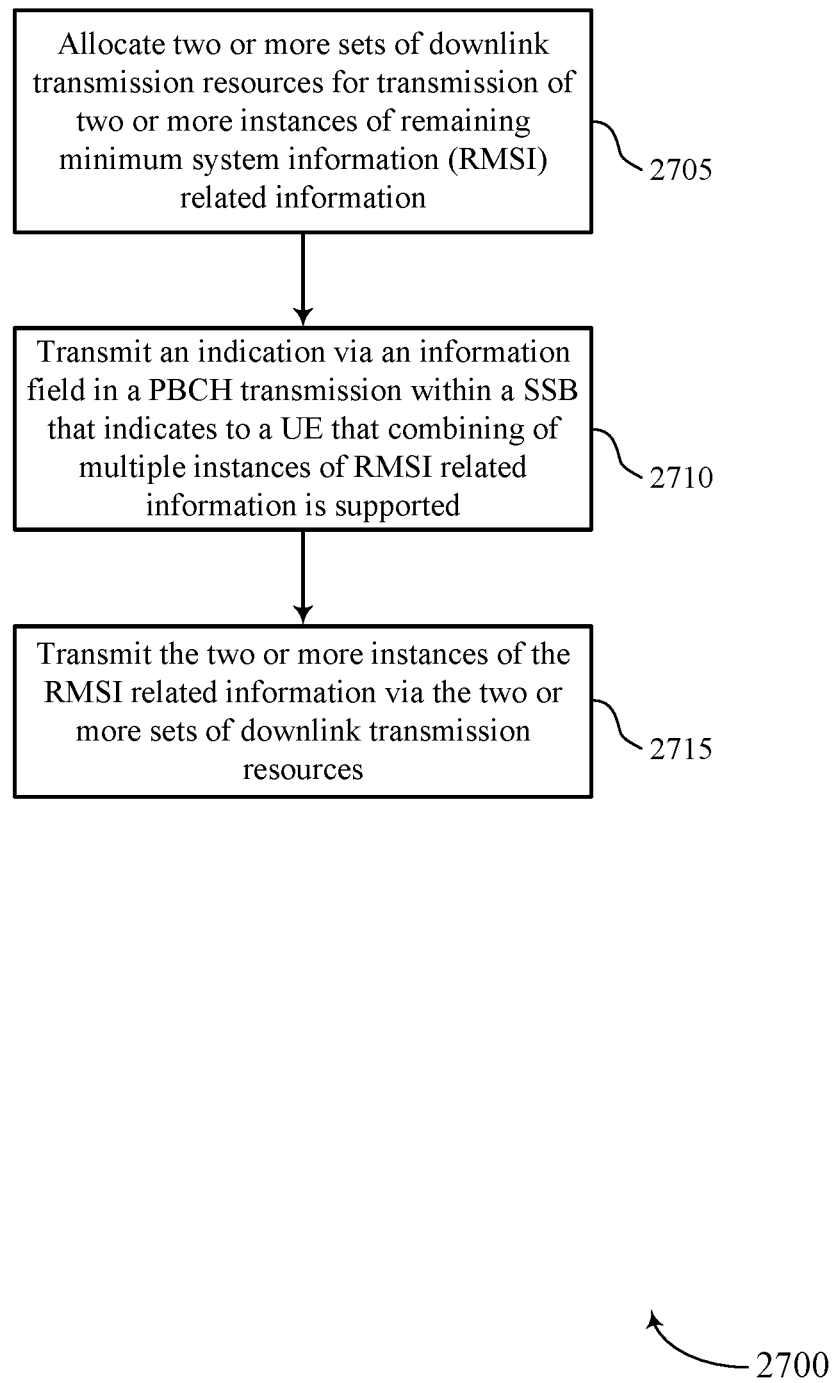

FIG. 27 shows a flowchart illustrating a method 2700 that supports control information combining techniques in wireless communications in accordance with aspects of the present disclosure. The operations of method 2700 may be implemented by a base station 105 or its components as described herein. For example, the operations of method 2700 may be performed by a communications manager as described with reference to FIGS. 13 to 16. In some examples, a base station 105 may execute a set of instructions to control the functional elements of the base station 105 to perform the functions described below. Additionally or alternatively, a base station 105 may perform aspects of the functions described below using special-purpose hardware.

At 2705, the base station 105 may allocate two or more sets of downlink transmission resources for transmission of two or more instances of remaining minimum system information (RMSI) related information. The operations of 2705 may be performed according to the methods described herein. In some examples, aspects of the operations of 2705 may be performed by a RMSI configuration component as described with reference to FIGS. 13 to 16.

At 2710, the base station 105 may transmit an indication via an information field in a PBCH transmission within a SSB that indicates to a UE 115 that combining of multiple instances of RMSI related information is supported. The operations of 2710 may be performed according to the methods described herein. In some examples, aspects of the operations of 2710 may be performed by a PBCH component as described with reference to FIGS. 13 to 16.

At 2715, the base station 105 may transmit the two or more instances of the RMSI related information via the two or more sets of downlink transmission resources. The operations of 2715 may be performed according to the methods described herein. In some examples, aspects of the operations of 2715 may be performed by a RMSI transmission component as described with reference to FIGS. 13 to 16.

Figure 28:
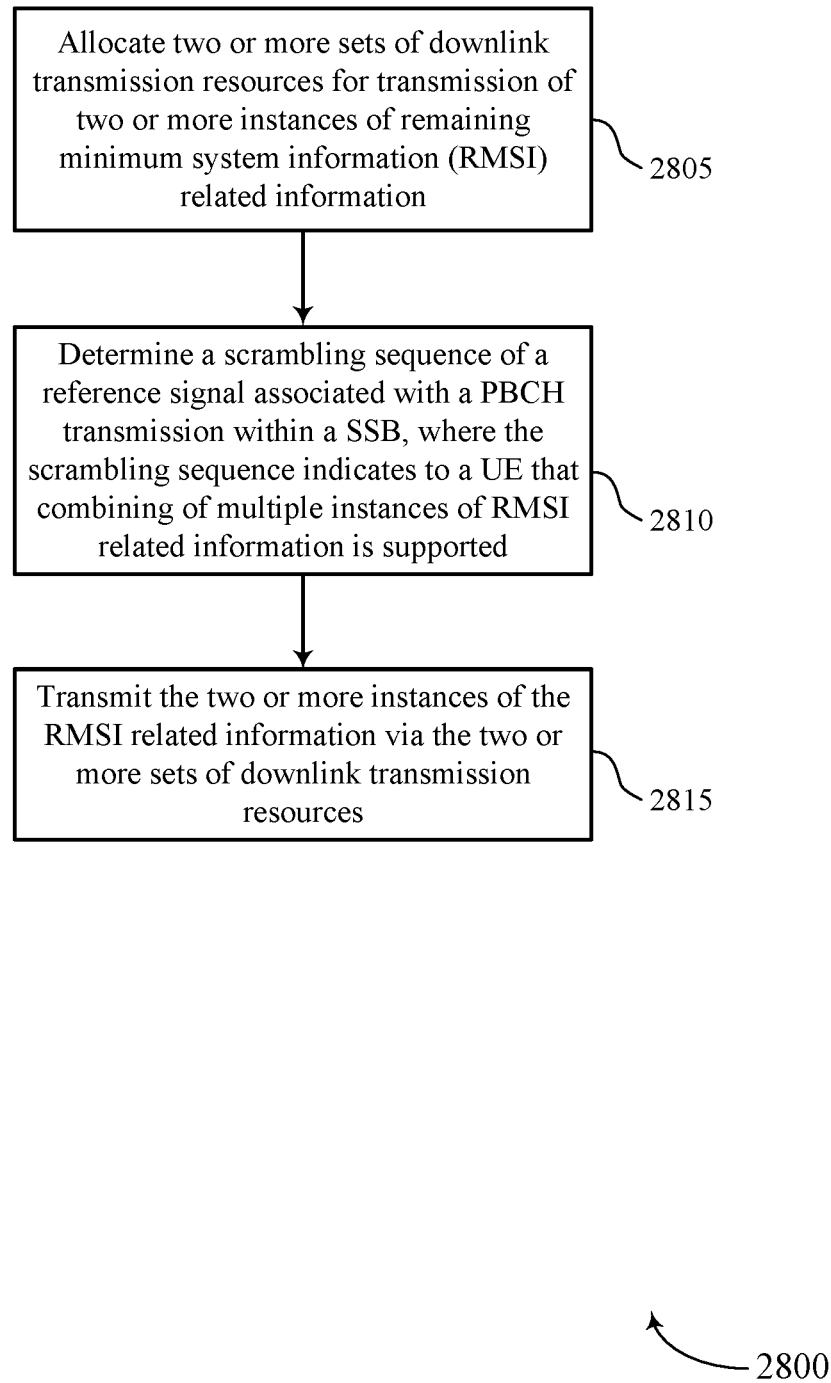

FIG. 28 shows a flowchart illustrating a method 2800 that supports control information combining techniques in wireless communications in accordance with aspects of the present disclosure. The operations of method 2800 may be implemented by a base station 105 or its components as described herein. For example, the operations of method 2800 may be performed by a communications manager as described with reference to FIGS. 13 to 16. In some examples, a base station 105 may execute a set of instructions to control the functional elements of the base station 105 to perform the functions described below. Additionally or alternatively, a base station 105 may perform aspects of the functions described below using special-purpose hardware.

At 2805, the base station 105 may allocate two or more sets of downlink transmission resources for transmission of two or more instances of remaining minimum system information (RMSI) related information. The operations of 2805 may be performed according to the methods described herein. In some examples, aspects of the operations of 2805 may be performed by a RMSI configuration component as described with reference to FIGS. 13 to 16.

At 2810, the base station 105 may determine a scrambling sequence of a reference signal associated with a PBCH transmission within a SSB, where the scrambling sequence indicates to a UE 115 that combining of multiple instances of RMSI related information is supported. The operations of 2810 may be performed according to the methods described herein. In some examples, aspects of the operations of 2810 may be performed by a scrambling sequence component as described with reference to FIGS. 13 to 16.

At 2815, the base station 105 may transmit the two or more instances of the RMSI related information via the two or more sets of downlink transmission resources. The operations of 2815 may be performed according to the methods described herein. In some examples, aspects of the operations of 2815 may be performed by a RMSI transmission component as described with reference to FIGS. 13 to 16.

Figure 29:
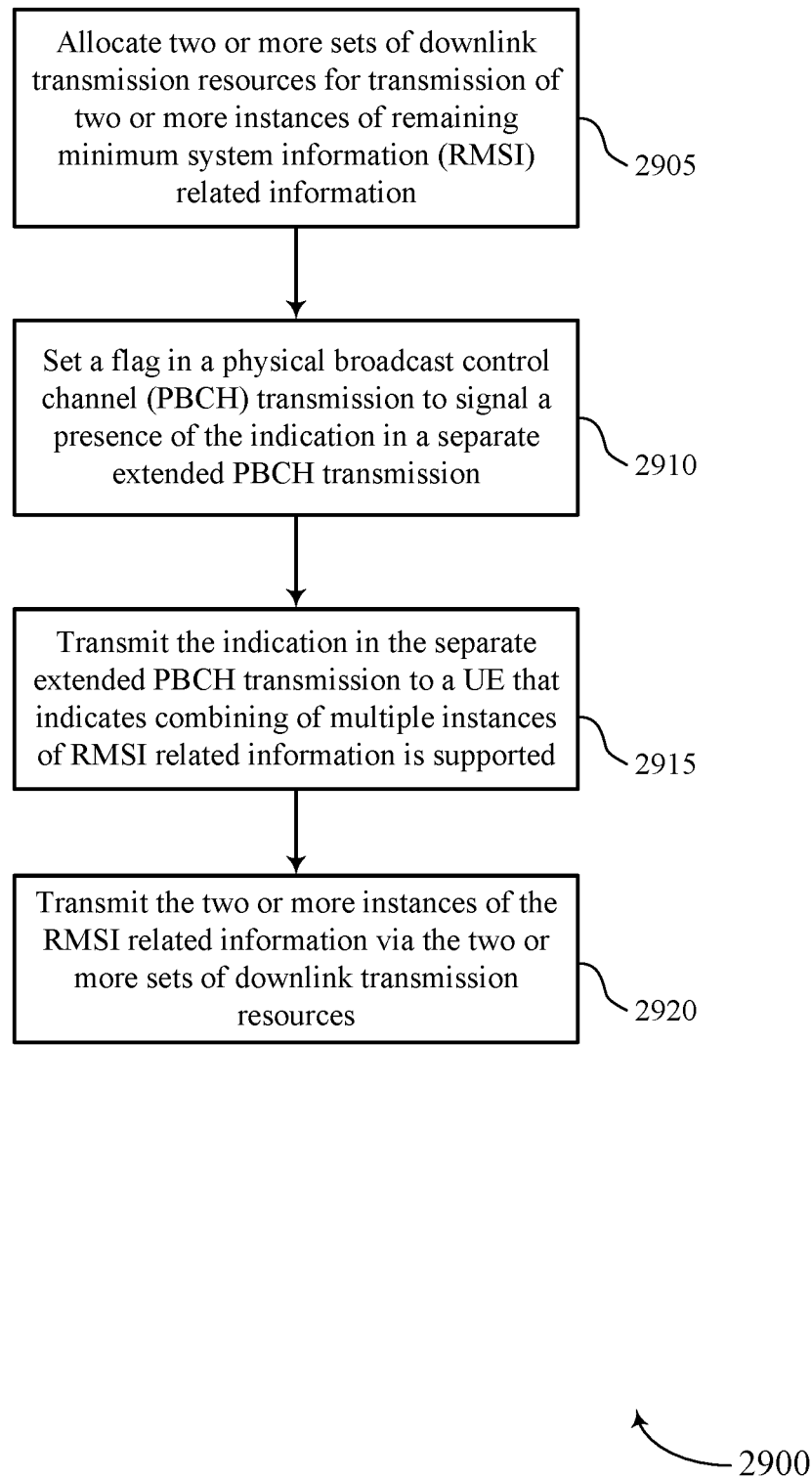

FIG. 29 shows a flowchart illustrating a method 2900 that supports control information combining techniques in wireless communications in accordance with aspects of the present disclosure. The operations of method 2900 may be implemented by a base station 105 or its components as described herein. For example, the operations of method 2900 may be performed by a communications manager as described with reference to FIGS. 13 to 16. In some examples, a base station 105 may execute a set of instructions to control the functional elements of the base station 105 to perform the functions described below. Additionally or alternatively, a base station 105 may perform aspects of the functions described below using special-purpose hardware.

At 2905, the base station 105 may allocate two or more sets of downlink transmission resources for transmission of two or more instances of remaining minimum system information (RMSI) related information. The operations of 2905 may be performed according to the methods described herein. In some examples, aspects of the operations of 2905 may be performed by a RMSI configuration component as described with reference to FIGS. 13 to 16.

At 2910, the base station 105 may set a flag in a physical broadcast control channel (PBCH) transmission to signal a presence of the indication in a separate extended PBCH transmission. The operations of 2910 may be performed according to the methods described herein. In some examples, aspects of the operations of 2910 may be performed by a PBCH component as described with reference to FIGS. 13 to 16.

At 2915, the base station 105 may transmit the indication in the separate extended PBCH transmission to a UE 115 that indicates combining of multiple instances of RMSI related information is supported. The operations of 2915 may be performed according to the methods described herein. In some examples, aspects of the operations of 2915 may be performed by a PBCH component as described with reference to FIGS. 13 to 16.

At 2920, the base station 105 may transmit the two or more instances of the RMSI related information via the two or more sets of downlink transmission resources. The operations of 2920 may be performed according to the methods described herein. In some examples, aspects of the operations of 2920 may be performed by a RMSI transmission component as described with reference to FIGS. 13 to 16.

Figure 30:
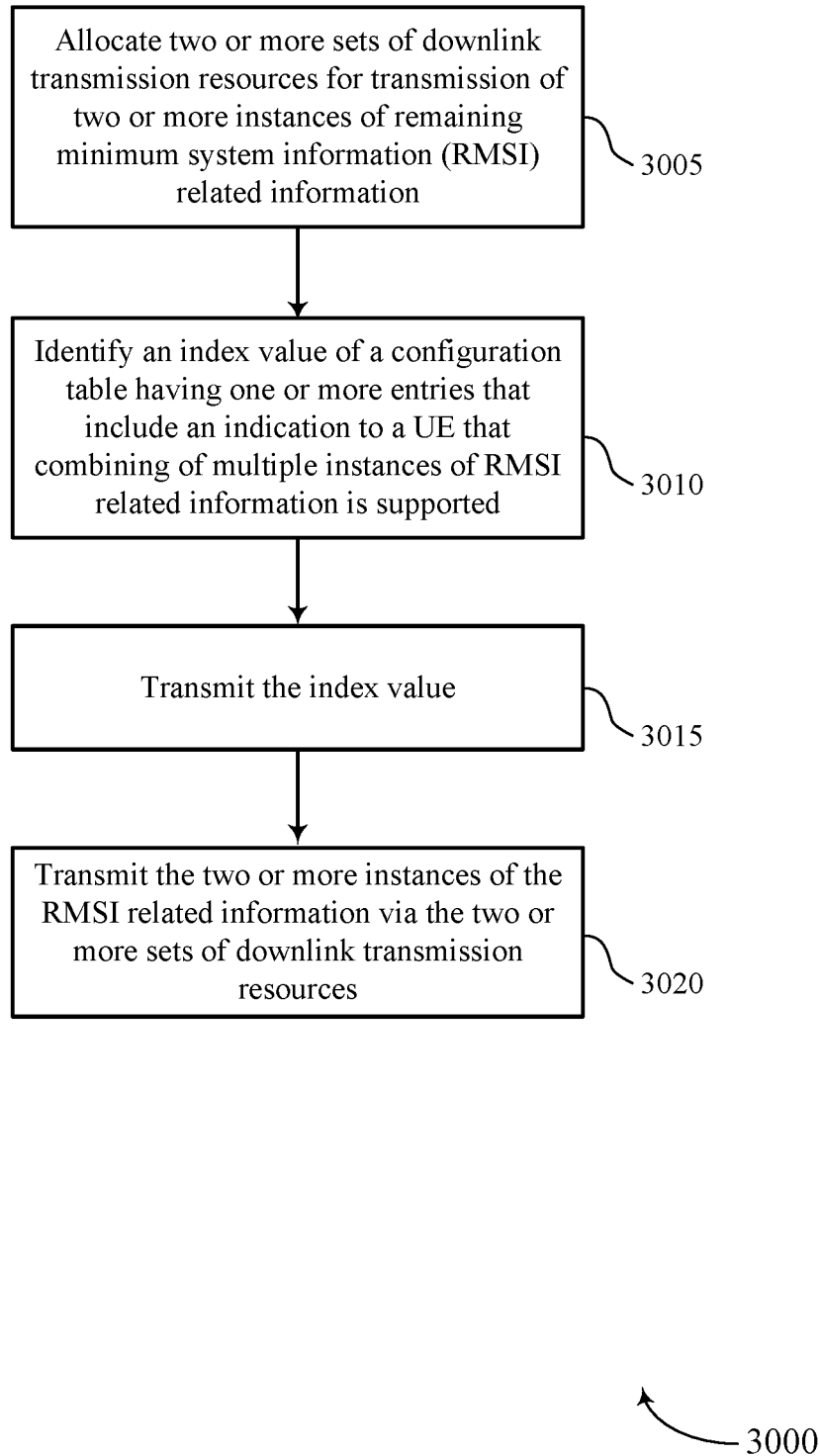

FIG. 30 shows a flowchart illustrating a method 3000 that supports control information combining techniques in wireless communications in accordance with aspects of the present disclosure. The operations of method 3000 may be implemented by a base station 105 or its components as described herein. For example, the operations of method 3000 may be performed by a communications manager as described with reference to FIGS. 13 to 16. In some examples, a base station 105 may execute a set of instructions to control the functional elements of the base station 105 to perform the functions described below. Additionally or alternatively, a base station 105 may perform aspects of the functions described below using special-purpose hardware.

At 3005, the base station 105 may allocate two or more sets of downlink transmission resources for transmission of two or more instances of remaining minimum system information (RMSI) related information. The operations of 3005 may be performed according to the methods described herein. In some examples, aspects of the operations of 3005 may be performed by a RMSI configuration component as described with reference to FIGS. 13 to 16.

At 3010, the base station 105 may identify an index value of a configuration table having one or more entries that include an indication to a UE 115 that combining of multiple instances of RMSI related information is supported. The operations of 3010 may be performed according to the methods described herein. In some examples, aspects of the operations of 3010 may be performed by a RMSI configuration component as described with reference to FIGS. 13 to 16.

At 3015, the base station 105 may transmit the index value. The operations of 3015 may be performed according to the methods described herein. In some examples, aspects of the operations of 3015 may be performed by a RMSI configuration component as described with reference to FIGS. 13 to 16.

At 3020, the base station 105 may transmit the two or more instances of the RMSI related information via the two or more sets of downlink transmission resources. The operations of 3020 may be performed according to the methods described herein. In some examples, aspects of the operations of 3020 may be performed by a RMSI transmission component as described with reference to FIGS. 13 to 16.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving, from a base station, an indication that combining of multiple instances of remaining minimum system information (RMSI) related information is supported;
   identifying, based at least in part on the indication, two or more instances within downlink transmission resources configured for RMSI related information transmissions;
   combining signals received in each of the two or more instances to generate a combined RMSI related information signal; and
   decoding the combined RMSI related information signal to obtain the RMSI related information.

2. The method of claim 1, wherein the RMSI related information includes scheduling information for an RMSI transmission.

3. The method of claim 1, wherein the RMSI related information includes a payload of an RMSI transmission.

4. The method of claim 1, wherein the two or more instances within downlink transmission resources configured for RMSI related information transmissions comprise two or more resources scheduled by a physical broadcast channel (PBCH) or a physical downlink control channel (PDCCH) associated with a given synchronization signal block (SSB) ID, two or more resources scheduled by the PBCH or the PDCCH associated with different SSB IDs, or any combination thereof.

5. The method of claim 1, wherein the receiving the indication comprises:
   receiving the indication via at least one tone of one or more resource blocks (RBs) that are partially occupied by a synchronization signal.

6. The method of claim 5, wherein the at least one tone provides at least a one bit indicator via one or more RBs that are partially occupied by a primary synchronization signal (PSS), a secondary synchronization signal (SSS), or combinations thereof.

7. The method of claim 1, wherein the receiving the indication comprises:
   determining a phase difference between a first reference signal and a second reference signal transmitted within a synchronization signal block (SSB), wherein a value of the indication from the base station is identified based on the phase difference.

8. The method of claim 7, wherein the first reference signal is a primary synchronization signal (PSS) transmitted within the SSB, and the second reference signal is a secondary synchronization signal (SSS) transmitted within the SSB.

9. The method of claim 1, wherein the receiving the indication comprises:
   receiving the indication via an information field in a physical broadcast control channel (PBCH) transmission within a synchronization signal block (SSB).

10. The method of claim 1, wherein the receiving the indication comprises:
    determining a scrambling sequence of a reference signal associated with a physical broadcast control channel (PBCH) transmission within a synchronization signal block (SSB), wherein a value of the indication from the base station is identified based on which of a plurality of available scrambling sequences is used to scramble the reference signal.

11. The method of claim 1, wherein the receiving the indication comprises:
    determining that a flag in a physical broadcast control channel (PBCH) transmission is set to signal a presence of the indication in a separate extended PBCH transmission; and
    monitoring for the indication in the separate extended PBCH transmission.

12. The method of claim 11, wherein the separate extended PBCH transmission is transmitted by the base station via predefined wireless resources associated with a synchronization signal block (SSB).

13. The method of claim 1, wherein the receiving the indication comprises:
   receiving a first synchronization signal block (SSB) that does not include RMSI transmissions; and
   decoding, from the first SSB, the indication and an identification of at least a second SSB that includes at least on instance of the RMSI related information.

14. The method of claim 13, wherein the receiving the identification of at least the second SSB comprises a frequency offset of the second SSB relative to the first SSB.

15. The method of claim 1, wherein the receiving the indication comprises:
   receiving configuration information including an index value for a configuration table; and
   determining, based at least in part on configuration table entries associated with the index value, that combining of multiple instances of the RMSI related information is supported in transmissions from the base station.

16. The method of claim 15, wherein the configuration table further indicates downlink transmission resources associated with the two or more instances of the RMSI related information.

17. A method for wireless communication, comprising:
   allocating two or more sets of downlink transmission resources for transmission of two or more instances of remaining minimum system information (RMSI) related information;
   transmitting an indication to a user equipment (UE) that combining of multiple instances of RMSI related information is supported; and
   transmitting the two or more instances of the RMSI related information via the two or more sets of downlink transmission resources.

18. The method of claim 17, wherein the two or more sets of downlink transmission resources for transmission of the two or more instances of RMSI related information comprise two or more resources scheduled by a physical broadcast channel (PBCH) or a physical downlink control channel (PDCCH) associated with a given synchronization signal block (SSB) ID, two or more resources scheduled by the PBCH or the PDCCH associated with different SSB IDs, or any combination thereof.

19. The method of claim 17, wherein the transmitting the indication comprises:
   transmitting the indication via at least one tone of one or more resource blocks (RBs) that are partially occupied by a synchronization signal.

20. The method of claim 19, wherein the at least one tone provides at least a one bit indicator via one or more RBs that are partially occupied by a primary synchronization signal (PSS), a secondary synchronization signal (SSS), or combinations thereof.

21. The method of claim 17, wherein the transmitting the indication comprises:
   selecting a phase difference between a first reference signal and a second reference signal transmitted within a synchronization signal block (SSB), wherein a value of the phase difference provides the indication; and
   transmitting the first reference signal and the second reference signal based at least on the phase difference.

22. The method of claim 21, wherein the first reference signal is a primary synchronization signal (PSS) transmitted within the SSB, and the second reference signal is a secondary synchronization signal (SSS) transmitted within the SSB.

23. The method of claim 17, wherein the transmitting the indication comprises:
   transmitting the indication via an information field in a physical broadcast control channel (PBCH) transmission within a synchronization signal block (SSB).

24. The method of claim 17, wherein the transmitting the indication comprises:
   determining a scrambling sequence of a reference signal associated with a physical broadcast control channel (PBCH) transmission within a synchronization signal block (SSB), wherein a value of the indication is identified based on which of a plurality of available scrambling sequences is used to scramble the reference signal.

25. The method of claim 17, wherein the transmitting the indication comprises:
   setting a flag in a physical broadcast control channel (PBCH) transmission to signal a presence of the indication in a separate extended PBCH transmission; and
   transmitting the indication in the separate extended PBCH transmission.

26. The method of claim 25, wherein the separate extended PBCH transmission is transmitted via predefined wireless resources associated with a synchronization signal block (SSB).

27. The method of claim 17, wherein the transmitting the indication comprises:
   transmitting a first synchronization signal block (SSB) that includes the indication and an identification at least a second SSB that includes at least on instance of the RMSI related information, wherein the identification of at least the second SSB comprises a frequency offset of the second SSB relative to the first SSB.

28. The method of claim 17, wherein the transmitting the indication comprises:
   identifying an index value of a configuration table having one or more entries that include the indication; and
   transmitting the index value, wherein the configuration table further indicates downlink transmission resources associated with the two or more instances of the RMSI related information.

29. An apparatus for wireless communication, comprising:
   a processor,
   memory in electronic communication with the processor; and
   instructions stored in the memory and executable by the processor to cause the apparatus to:
      receive, from a base station, an indication that combining of multiple instances of remaining minimum system information (RMSI) related information is supported;
      identify, based at least in part on the indication, two or more instances within downlink transmission resources configured for RMSI related information transmissions;
      combine signals received in each of the two or more instances to generate a combined RMSI related information signal; and
      decode the combined RMSI related information signal to obtain the RMSI related information.

30. An apparatus for wireless communication, comprising:

a processor,
memory in electronic communication with the processor; and
instructions stored in the memory and executable by the processor to cause the apparatus to:
- allocate two or more sets of downlink transmission resources for transmission of two or more instances of remaining minimum system information (RMSI) related information;
- transmit an indication to a user equipment (UE) that combining of multiple instances of RMSI related information is supported; and
- transmit the two or more instances of the RMSI related information via the two or more sets of downlink transmission resources.

* * * * *